US011409563B2

(12) United States Patent
Rajadurai et al.

(10) Patent No.: US 11,409,563 B2
(45) Date of Patent: Aug. 9, 2022

(54) ALLOCATION OF CLOUD-BASED RESOURCES FOR BACKUP/RECOVERY SERVICES

(71) Applicant: Oracle International Corporation, Redwood Shores, CA (US)

(72) Inventors: Angelo Rajadurai, North Attleboro, MA (US); Deepika Muthukumar, Painted Post, NY (US); Sriram V. R Nagaraja Rao, Frisco, TX (US)

(73) Assignee: Oracle International Corporation

(*) Notice: Subject to any disclaimer, the term of this patent is extended or adjusted under 35 U.S.C. 154(b) by 317 days.

(21) Appl. No.: 16/569,641

(22) Filed: Sep. 12, 2019

(65) Prior Publication Data
US 2021/0081246 A1 Mar. 18, 2021

(51) Int. Cl.
*G06F 9/50* (2006.01)
*G06F 11/14* (2006.01)

(52) U.S. Cl.
CPC ........ *G06F 9/5016* (2013.01); *G06F 11/1451* (2013.01); *G06F 2201/80* (2013.01)

(58) Field of Classification Search
CPC .............. G06F 9/5016; G06F 11/1451; G06F 2201/80; G06F 2201/81; G06F 11/1448
See application file for complete search history.

(56) References Cited

U.S. PATENT DOCUMENTS

| | | | | |
|---|---|---|---|---|
| 7,185,167 B2* | 2/2007 | Sollich | .................. | G06F 9/5016 718/104 |
| 9,026,765 B1* | 5/2015 | Marshak | ............. | G06F 12/0866 711/170 |
| 9,798,629 B1* | 10/2017 | Shilane | ............... | G06F 11/1464 |
| 2010/0293328 A1* | 11/2010 | Kishi | .................... | G06F 12/084 711/170 |
| 2011/0191777 A1* | 8/2011 | Bansal | ..................... | G06F 9/46 718/102 |
| 2017/0091045 A1* | 3/2017 | Bangalore | ........... | G06F 11/1461 |

OTHER PUBLICATIONS

Crainic, T. G. et al., "Bin Packing Problems with uncertainty on item characteristics: an application to capacity planning in logistics", *Procedia—Social and Behavioral Sciences 111* (2014) 654-66, (Feb. 2014).
Calmasini, M. et al., "Zero Data Loss Recovery Appliance: Best Practices from Customer Deployments", Oracle Open World, (Sep. 2016).
Oracle, "Zero Data Loss Recovery Appliance", Oracle White Paper, (Sep. 2019).
Chien, T. et al., "Zero Data Loss Recovery Appliance: Insider's Guide to Architecture & Best Practices", Oracle Open World, (Oct. 24, 2018).

(Continued)

*Primary Examiner* — Cam Linh T Nguyen
(74) *Attorney, Agent, or Firm* — Vista IP Law Group, LLP

(57) ABSTRACT

Disclosed is an improved system, method, and computer program product to allocate backup devices for a database system, where an appropriate appliance can be automatically allocated to accommodate backups. The allocation selects an appliance that effectively balances space allocation needs of the database with overall performance effects on a multi-tenant backup system that handles multiple databases of varying sizes.

21 Claims, 21 Drawing Sheets

(56) References Cited

OTHER PUBLICATIONS

Oracle, "Oracle Database Backup Service", Oracle Corporation, (Jun. 2015), publication date unknown; date retrieved from google.
Suri, S., "Approximation Algorithms", (Nov. 27, 2017).
Peng, J. F. et al., "Bin Packing Problem with Uncertain Volumes and Capacities", (2012).
Watson, T. "5.1 Bin Packing", (Feb. 6, 2007).
Darapuneni, Y. J., "A Survey of Classical and Recent Results in Bin P y of Classical and Recent Results in Bin Packing Problem", UNLV Theses, Dissertations, Professional Papers, and Capstones, (Aug. 1, 2012).

* cited by examiner

ALLOCATION OF CLOUD-BASED RESOURCES FOR BACKUP/RECOVERY SERVICES

BACKGROUND

Many computing environments need to generate data backups on a periodic basis. The backup generally makes a copy of a set of data to a secondary storage device and/or location. The backup is performed to make sure that adequate data retention is performed for a set of data within the system.

There are many reasons for performing data backups. For example, a common reason to generate backups is to provide data loss prevention in the event of system failure, corruption, or malware attack. Another reason is to maintain a set of data that can be tracked for analysis or auditing purposes. The backups can also be used for archiving purposes. In a database environment, it is very common to create backups of the content within a database. For a relational database system, the database backup will typically include a copy of all database tables that exist within the database. On an ongoing basis, the backup system will also include incremental changes that occur since the time of the last full backup. For a database system, these incremental backups may include for example, copies of log data (e.g., redo logs) that correspond to changes that occur in the database system since the time of the last full backup.

For many backup systems, a storage appliance having a designated storage sized is selected to handle the storage functions. For example, a storage appliance may be selected that includes a 600 Terabyte storage capacity. The selection of an appliance having the appropriate storage size is very important for many backup applications. For instance, many database systems will not allow the data for a given database to extend across multiple storage appliances, and thus the size capacity of the selected appliance must be large enough to fit the entire database within that single appliance.

Conventionally, the onus is on the user/customer to predict exactly how much space is needed for the storage appliance. The problem with this approach is that it is often difficult to know ahead of time exactly how much space is needed in the backup appliance, especially for a database system that is constantly undergoing changes. This means that there is a very real chance that the user guesses wrong and selects an appliance that is too small, resulting in the appliance running out of space during the backup operations. In addition, this approach of placing the onus on the user does not work very well for multi-tenant cloud-based backup systems where the same appliance hardware needs to be shared among multiple users.

What is needed, therefore, is a method and/or system that overcomes these problems, and which more efficiently allocates backup devices for a database system.

SUMMARY

According to some embodiments, an improved system, method, and computer program product is provided for improving allocation of backup/recovery appliances to databases. The allocation approach selects an appliance that effectively balances space allocation needs of the database with overall performance effects on a multi-tenant backup system that handles multiple databases of varying sizes.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

According to some embodiments, an improved system, method, and computer program product is provided to allocate backup devices for a database system, where an appropriate appliance can be automatically allocated to accommodate backups. The allocation selects an appliance that effectively balances space allocation needs of the database with overall performance effects on a multi-tenant backup system that handles multiple databases of varying sizes.

Figure 1:
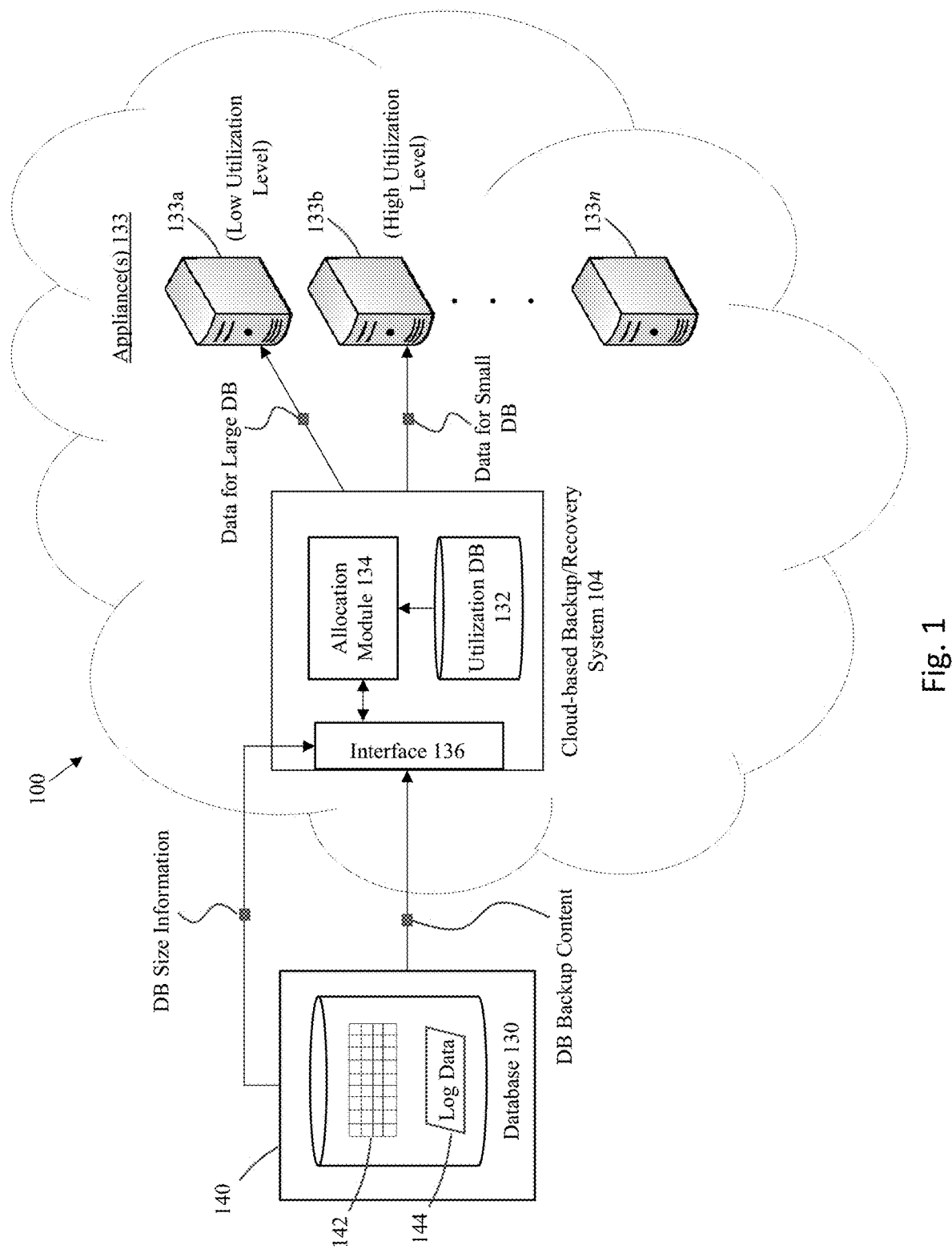
FIG. 1 illustrates a system for implementing some embodiments of the invention.

FIG. 1 illustrates a system for implementing some embodiments of the invention. The illustrated system is implemented in a cloud-based environment, although it is noted the inventive techniques are not limited in their application only to cloud-based environments. A database system 140 may include a database 130 that needs to be backed up on a regular basis. The database 130 may include one or more database objects, such as relational database table 142 that contains the data that is stored within the database 130. In addition, the database 130 may include log data 144, such as redo logs or undo logs. Other data for the database 130 that may need to be backed up include, for example, metadata such as the database data dictionary.

A cloud-based database protection system 100 is illustrated that includes a recovery cloud service management system 104 and a plurality of storage/recovery appliances 133a, 133b, . . . 133n. The cloud-based database protection system 100 may be used to implement, for example, cloud-scale database protection as a service. The backup service may employ the concept of a protection policy, which defines recovery goals that are implemented on a per-database basis. Using protection policies, databases can be grouped by recovery service tier, where each tier can be customized to support different service level agreements, e.g., where the different service levels pertain to different numbers of days for a recover window, e.g., where a "gold" policy corresponds to a 35 day recovery window on a recovery appliance and a "silver policy" corresponds to a 10 day recovery window on a recovery appliance. The recovery window-oriented space management approach minimizes and/or eliminates the need to manage space at an opaque storage-volume level as is typical with generic backup appliances. With this approach, data protection is aligned with the needs of each specific database across the system on the appropriate appliance. As additional databases within the enterprise are protected by the system, compute servers and storage servers can be added to the system, providing scale-out data protection in the cloud that supports growth of the user database systems.

In some embodiments, the configuration of an appliance includes a combination of one or more compute servers and storage servers (e.g., two compute servers and three storage servers). Each appliance may be implemented as a rack-mounted configuration where an upgrade is incrementally performed by adding additional storage servers into the rack. If additional capacity is required, additional one or more racks can be connected to the first rack. The second rack includes its own pair of compute servers which add connectivity and processing power to the configuration. As with the first rack, storage capacity can be expanded by incrementally adding storage servers.

The recovery cloud service management system 104 may include a control plane having one or more components to implement recovery/backup as a service to the user system 140 for backing up/recovery to/from the one or more appliances 133. For example, the system 104 may include an interface 136 comprising one or more APIs, e.g., a customer facing API to manage recovery cloud services on behalf of a user/customer. A cloud-operator API may also be provided to manage the physical hardware. Yet another API may be provided to administer the operation of the cloud-based recovery/backup system. Each of these APIs may interact with various recovery service modules within system 104, e.g., to implement inventory management, customer management, proxy management, metering, and/or metrics reporting. For example, the customer-facing API may interact with a recovery cloud service management module to manage the service on behalf of the user. The cloud-operator API may interact with an infrastructure management module, e.g., for installation, patching, and/or management of the underlying hardware. A DB protection module may, for example, expose a REST API to provide administrative access, e.g., to add users or protected databases.

The system 104 may include an allocation module 134 to identify which of the appliances 133 should be assigned to a given database for a user. Size information for the user database may be received and/or generated by the allocation module to identify the appropriate appliance. Accurate allocation/sizing of the appliance depends at least in part on several factors related to protected databases, such as one or more of the following: the initial database size and growth rate, storage consumed by temp and undo, free space, database change rate, redo generation rate, desired recovery window, and compressibility of the database. The allocation module uses the sizing information to look through the list of available appliances to identify an appropriate match. The current utilization levels and/or capacity of the available appliances may be considered to perform the allocation, e.g., where information about the free space for each appliance is stored within a utilization database 132.

As previously noted, it is often problematic to require users to guess at the amount of free space that is needed for backups, since there is a cost if the user guess is incorrect. For example, if the guess is too low, the appliance may run out of free space, and/or additional expenses may need to be incurred to migrate data to a different appliance. If the guess is too high, then the downside pertains to the excessive space that may be unnecessarily allocated for the database. Therefore, rather than require the user to guess the free space requirements (or even underlying data to calculate the free space requirements such as the database growth rate), some embodiments only need the user to provide easily identifiable data such as the database size and the size of the protection window for which data needs to be stored at the appliance. As described in more detail below, these values are used to automatically allocate an appropriate appliance having the capability to handle backups for the user database, while also balancing the performance needs of the overall system.

In some embodiments, a protected database should be backed up to a single appliance, and thus the selected appliance must have enough free space to hold the entirety of the expected storage requirements (for a recovery window) for the protected database. However, it is noted that each appliance can hold the backups for any number of databases, where the constraint is the total size of the appliance relative to the required storage space for a given database. This means that multiple databases can be packed onto the same appliance, so long as the appliance has enough free space to fit the size requirements for those databases.

If there are multiple appliances that each have enough free space for the database, then theoretically any of these appliances can be selected to back up the database. However, in a cloud environment where there are numerous users that each have one or more databases to back up, an intelligent approach should be taken to balance the desire of the user to select the appliance that best maximizes performance for that user, while attempting to also balance the desire of the cloud provider to maximize the performance and/or utilization of the overall cloud system.

For example, at one extreme, the best service to the user could be obtained by always allocating the appliance with the most free space to that user, on the assumption that the freest appliance carries the least amount of workload and hence provides the best performance to the user due to load balancing across all the appliances. However, this approach of always spreading of workload across appliances to implement load balancing is likely to eventually result in the excessive spreading of data across all of the appliances, leading to fragmentation (too much spreading) and reduced utilization for the system appliances. In addition, this approach will not allow any appliances to be "reserved" for larger databases, which could minimize the chance of being able to match a large database to an available appliance.

At the other extreme, to reduce fragmentation, all databases are assigned to share appliances as much as possible to "pack" the appliances to their limit before allocating to a new appliance that is completely free. This approach does serve to minimize fragmentation across the system. However, performance to users may suffer unnecessarily, particularly to users that have relatively large databases, since packing databases as much as possible onto the same appliance may cause excessive contention for resources on those appliances (e.g., based upon a "noisy neighbor" problem). This may be especially frustrating to a user if there are other appliances that have little to no data on them that remain severely under-utilized.

Embodiments of the present invention provide an approach to automatically allocate an appliance to a database where a "best fit" is identified that optimizes performance to users as well as utilization for the cloud system, based at least in part on the size of the database. In particular, backup data for a large database is allocated to an appliance 133a having low utilization levels while backup data for a small database is allocated to an appliance 133b having high utilization levels where they are packed with data for other small databases.

Figure 2:
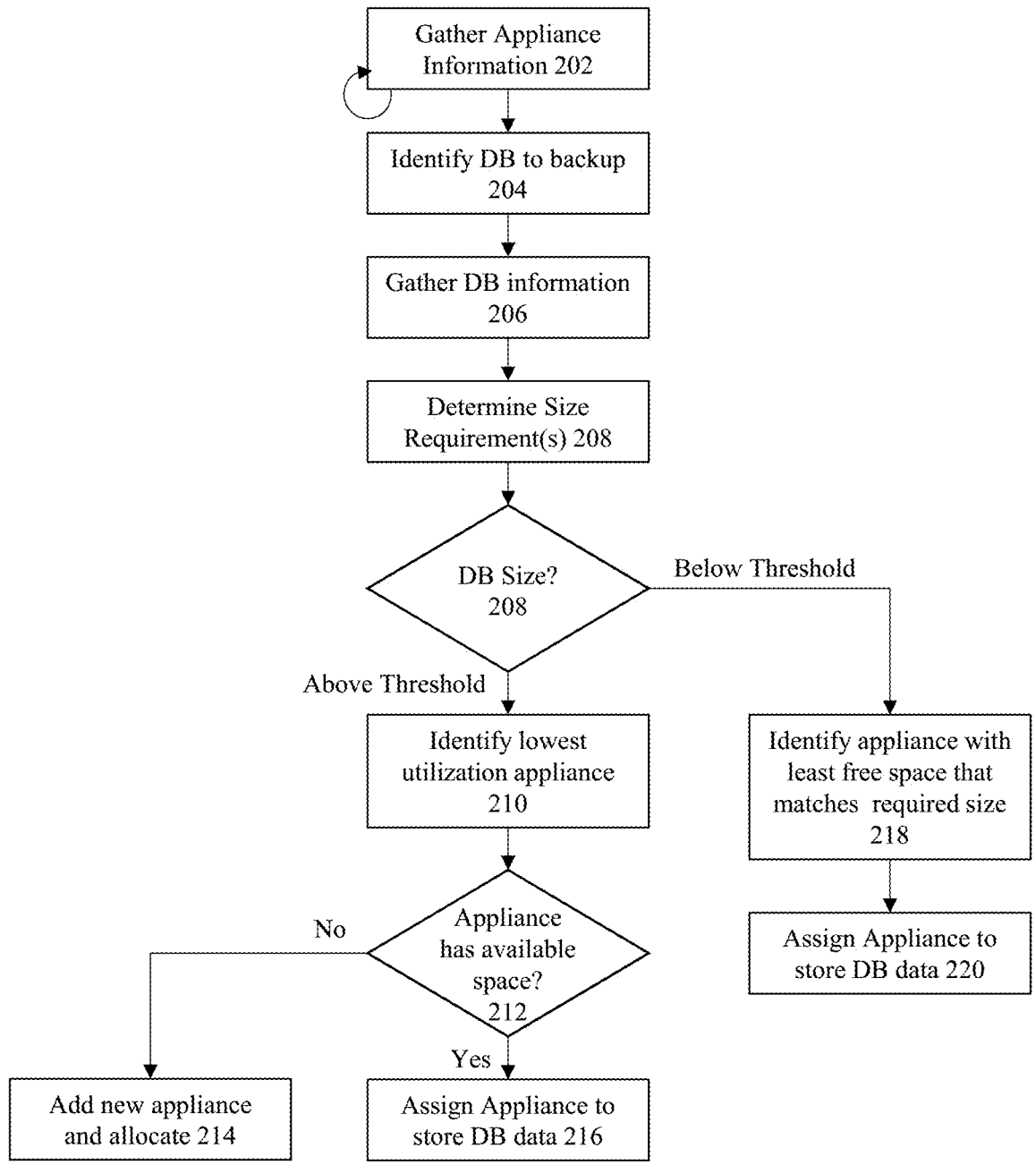
FIG. 2 shows a flowchart of an approach to perform allocations according to some embodiments of the invention.

FIG. 2 shows a flowchart of an approach to perform allocations according to some embodiments of the invention, which identifies the best fit for a given protected database by considering: (a) for best performance, it is desirable to evenly spread the databases on all the appliances; and (b) for reducing fragmentation, it is desirable to pack the appliances as much as possible. The allocation logic uses both these criteria and applies them where (i) if the database is relatively large, then the allocation logic attempts to spread the databases around for best performance, and (ii) if the database is relatively small, then the allocation logic attempts to pack the databases.

At step 202, information is gathered for the appliances on a regular basis. For example, the information that is gathered includes, a list of the available appliances, the amount of free space that is available on each appliance, and/or the number of databases/users that are associated with an appliance.

At 204, a database is identified for protection. As used herein, the term "protected database" refers to the database for a user/customer that is configured to send backups to the recovery/backup appliance.

At step 206, information for the allocation process is gathered for the identified database. For example, information regarding the size of the database to protect may be gathered. Such sizing information may pertain to one or more of the following backup data: (a) Level 0 (full) and Level 1 (incremental) backups to be sent from the database system to the appliance; (b) a catalog (e.g., RMAN catalog as used in database products available from Oracle Corporation) that contain the details of backups sent to the appliances; (c) log data, such as redo logs that contain details of transactions in the database on an ongoing basis that would be shipped to the appliance as they occur and/or as part of an archival log. The database size in some embodiments corresponds to the size of the protected database, correlating to a cumulative total of all tablespaces in the database.

Another item of information to identify for the database is the recovery window for the database. This is the amount of time that the backup data should be kept in the appliance before being to an archival storage system (e.g., long term tape storage). In some embodiments, this value may be associated with the protection policy that is assigned to the database, e.g., a "gold" or "silver" level policy having respective recovery window sizes.

At 208, the space requirement for the database is calculated. The "disk reserved space" refers to the amount of space that should be reserved on the appliance for a given protected database. In some embodiments, this value may be calculated based upon the database size, the "daily change rate", and the "daily average archival size". The daily change rate is the percentage of data in the protected database that changes every day. This defines the amount of the Level 1 backups that is sent to the appliance. The daily average archival log size is the average size of the daily archival logs generated by the protected database. These values may correlate to actual historical values that are tracked for a given database/user/customer, or may correlate to an estimated value based upon analysis of large numbers of similar databases and observed daily changes.

The following equation may be used in some embodiments to determine the disk reserved space:

Disk reserved space=Database Size+(Daily Change rate*Database size*Recovery Window)+(Daily Archival Log size*Recovery Window)

In many cases, the daily change rate and the daily average archival size are substantially equivalent to one another. This is the situation where there is a substantial one-to-one match between a given change to a database and the generation of an archival log entry for that change. However, in certain situations, there could be a significant deviation between the daily change rate and the daily average archival size. This may occur, for example, if the data in a database is changed over and over again throughout a given day, such that the database corresponds to a very high change rate. However, if all the changes occur on the same day, then the "archival" nature of the archival log may encapsulate many of the changes into a much smaller number of log entries (or even as small as a single archival log entry), which results in a large difference between the daily change rate and the daily average archival size. Nonetheless, for a new database that is to undergo backup operations to an appliance and/or where there may not be enough historical information specific to that database to know whether such a deviation exists, then one approach that can be taken is to assume that the daily change rate and the daily average archival size are roughly the same. For example, an estimated average change rate may be estimated to about 1.7% and average daily archival log size estimated to be around 1.8%, which are roughly equivalent. Based on this analysis, one can estimate the initial change rate and the archival log rate to be both at around the same level, for the reasons expressed above in the absence of actual/differing change rate/archival log numbers. In some embodiments, a 3% value is used for both (even if the actual estimate is 1.7-1.8%) with the higher 3% value chosen so that the cloud service can be more conservative for space allocation. This estimated rate value can be changed (e.g., reduced or increased) at any point in time based on actual experiences for operations in the cloud environment for the database.

Once the disk reserved space has been calculated, then at step 208, a determination is made whether the database should be classified as a large database or a small database. This classification is performed based on a configurable "database size threshold", which is a value that establishes the boundary between a large database and a small database for allocation purposes. If the dataset size exceeds the threshold, then it is considered a large database. Any database below the threshold is considered a small database. Any database that exactly matches the threshold may be considered either large or small as appropriate depending upon an optional choice by an implementer of this approach.

If this database size threshold is set to a very low value (e.g., zero), then all databases will be considered large and thus will induce spreading among all appliances. On the other hand, if this threshold is set to a very high number, then all/most protected databases would be considered small, causing the process to pack all/most protected databases into the appliances, thereby reducing fragmentation. A threshold value can be selected somewhere in-between to balance the allocations to optimize both performance and overall utilization.

In some embodiments, a fixed value may be selected, e.g., where the initial estimate of the DB size threshold is set to 1 TB. Alternatively, the threshold may be selected relative to the size profile(s) of the databases being serviced in the system. For example, the threshold may be set at the size of a given percentage (e.g., 90% cutoff percentile) of databases, where to minimize spreading the top 10% of datasets is considered large and the bottom 90% are considered small, or any other cutoff percentile as appropriate. Alternatively, to encourage more spreading, the median size of databases can be used as the threshold, where 50% of the databases is considered large and 50% considered small.

If the database is classified as a small database, then at 218, the process identifies the appliance with the least free space that can accommodate the database size for the protected database. Thereafter, at 220, that identified appliance is assigned to perform recovery/backup services for the database. This approach implements a best fit for packing across the various appliances.

On the other hand, if the database is classified as a large database, then at 210 identification is made of the appliance that has the most available free space. This approach implements a best fit for spreading across the various appliances.

A determination is made at 212 whether the identified appliance is capable of hosting the protected database. This check is made, for example, to make sure that the amount of free space on the appliance is large enough to accommodate the database size for the protected database. If the identified appliance is capable of hosting the protected database, then at 216 that identified appliance is assigned to perform recovery/backup services for the database.

If the identified appliance is not capable of hosting the protected database, then at 214 a new appliance is added to the system having enough free space to handle the database size of the protected database. The newly added appliance would then be assigned to perform recovery/backup services for the protected database.

Figure 3A:
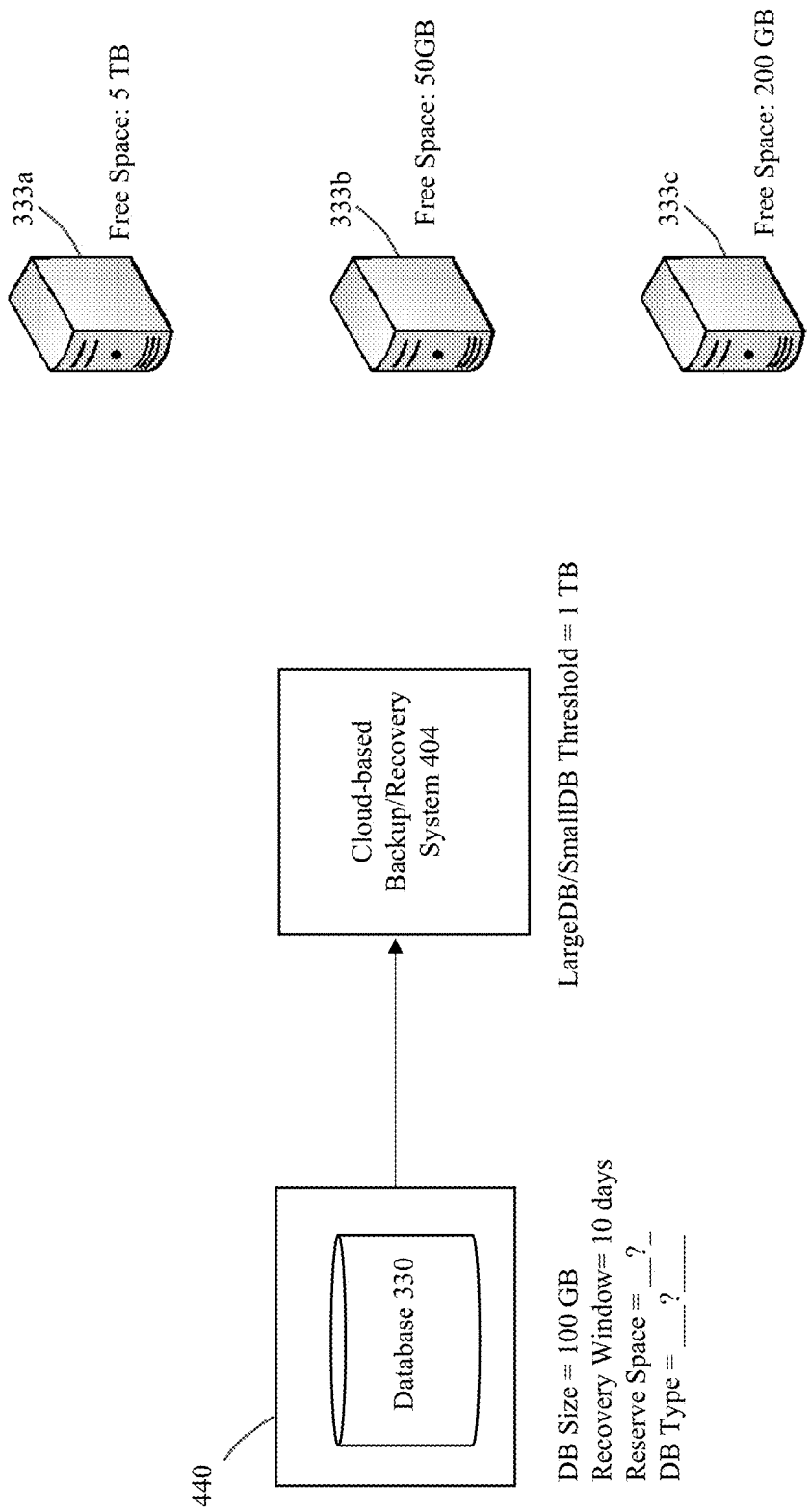
FIGS. 3A-3E provide an illustration of the situation involving a protected database that may be classified as a small database.

FIGS. 3A-E provide an illustration of the situation involving a protected database that may be classified as a small database. As shown in FIG. 3A, the user system 440 includes a database 330 that is to be serviced for recovery/backup purposes by one of the appliances 333*a*, 333*b*, or 333*c*. The backup/recovery system 404 handles allocation of one of the appliances 333*a*, 333*b*, or 333*c* to handle the backup/recovery needs of the database 330. In this example situation, appliance 333*a* has 5 TB of free space, appliance 333*b* has 50 GB of free space, and appliance 333*c* has 200 GB of free space.

For purposes of this illustrative example, assume that the database 330 has a database size of 100 GB and the recovery window for this protected database is configured as 10 days. In addition, the large/small database size threshold for allocations is set to 1 TB in this example.

Figure 3B:
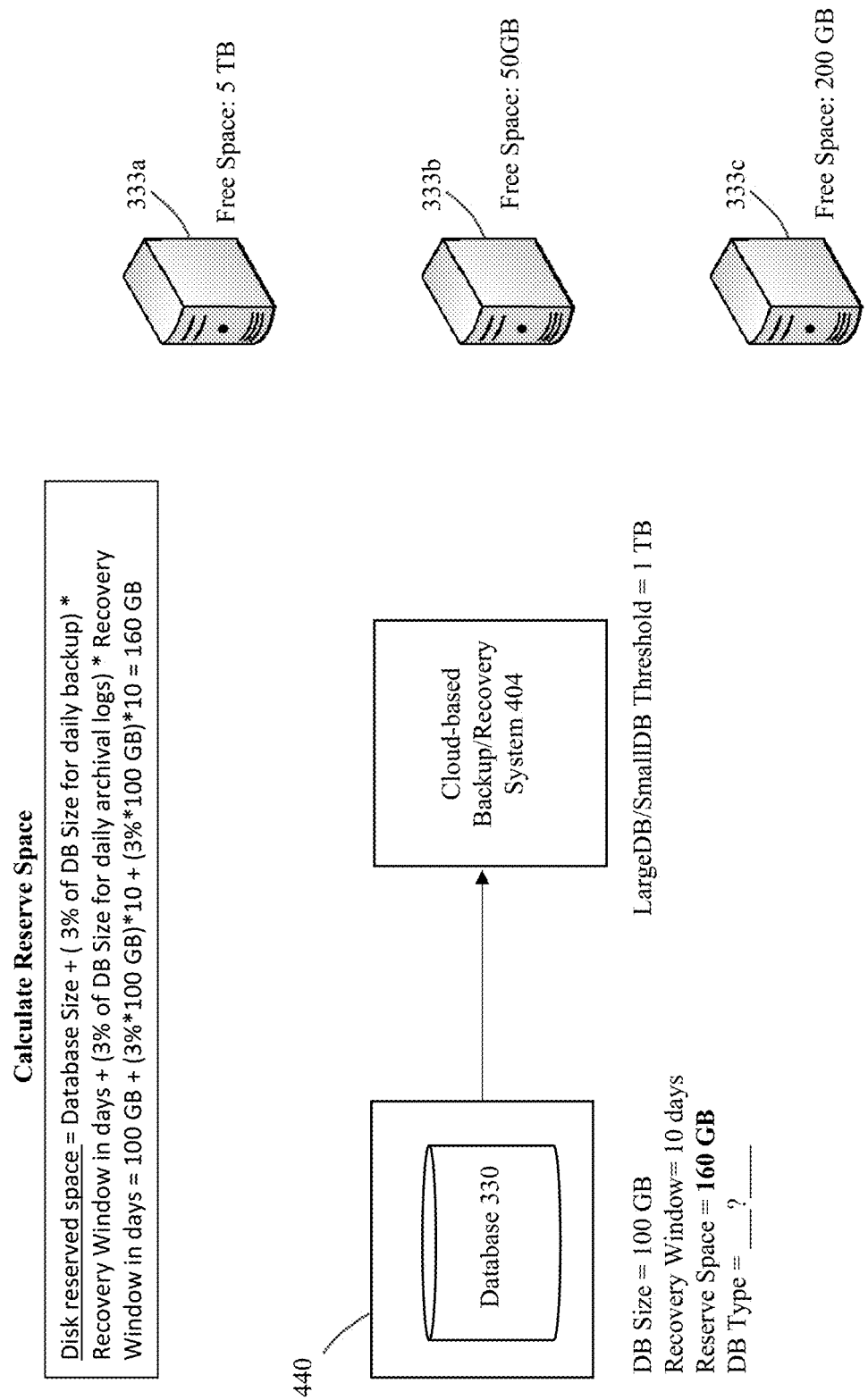

As illustrated in FIG. 3B, a determination is made of the disk reserved space that is needed to handle the backup/recovery services for database 330, which is the amount of free space at minimum that is needed to be able to assign an appliance to handle backups for the database 330. As previously noted, one possible approach to calculate the disk reserved space is to use the following formula: "Disk reserved space=Database Size+(Daily Change rate*Database size*Recovery Window)+(Daily Archival Log size*Recovery Window)". In the current example, a 3% rate is applied for both the daily change rate and the daily archival log size rate, for reasons explained above. This formula results in a determination that 160 GB of free space is needed as the disk reserve space.

Figure 3C:
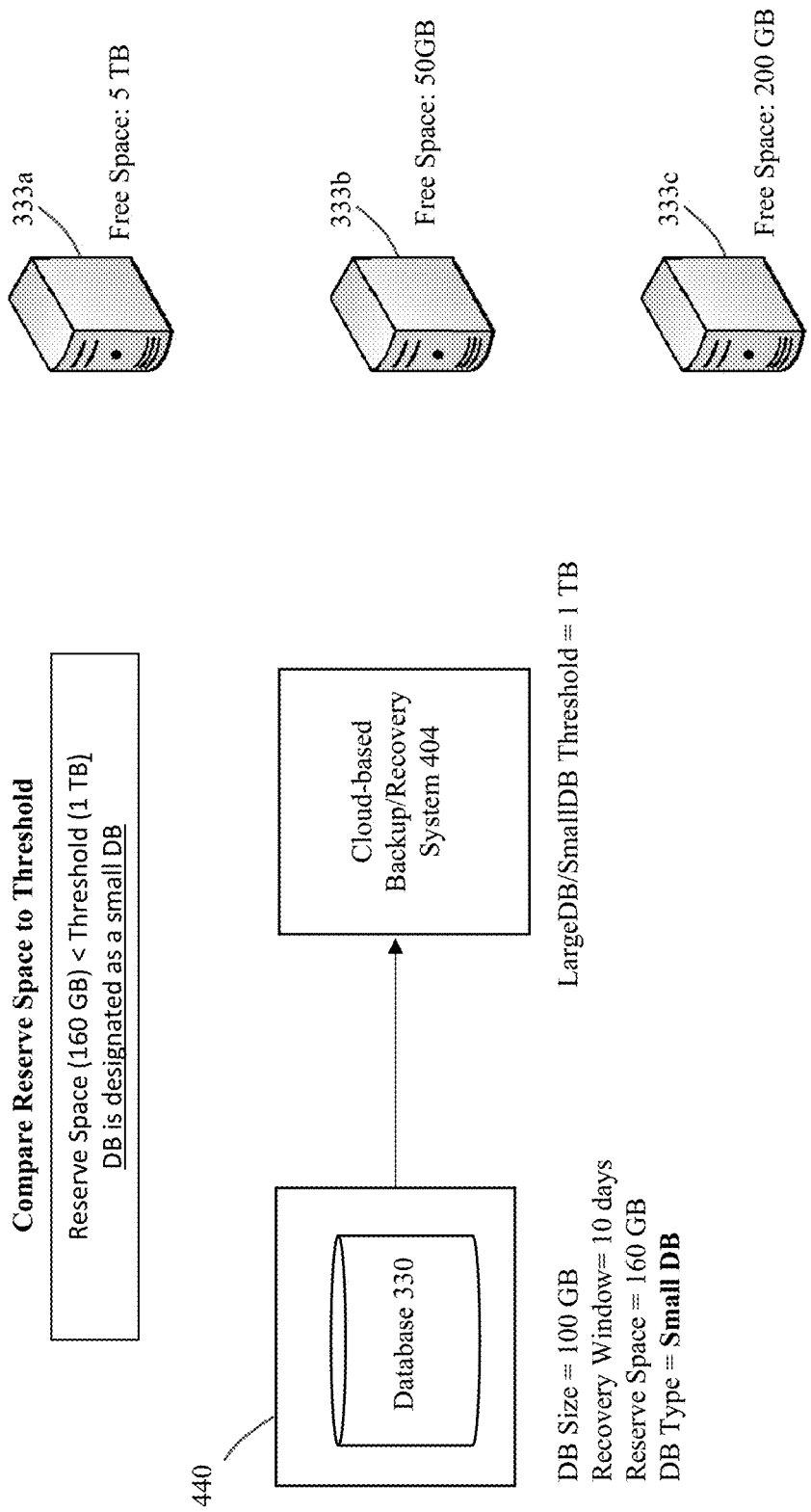

Next, a determination is made whether the database 330 corresponds to a large database or a small database. As illustrated in FIG. 3C, the threshold that has been set between the large and small databases for this system is 1 TB. Here, the reserve space for database 330 is 160 GB, which is less than the threshold of 1 TB. Therefore, the database 330 is classified as a small database.

Figure 3D:
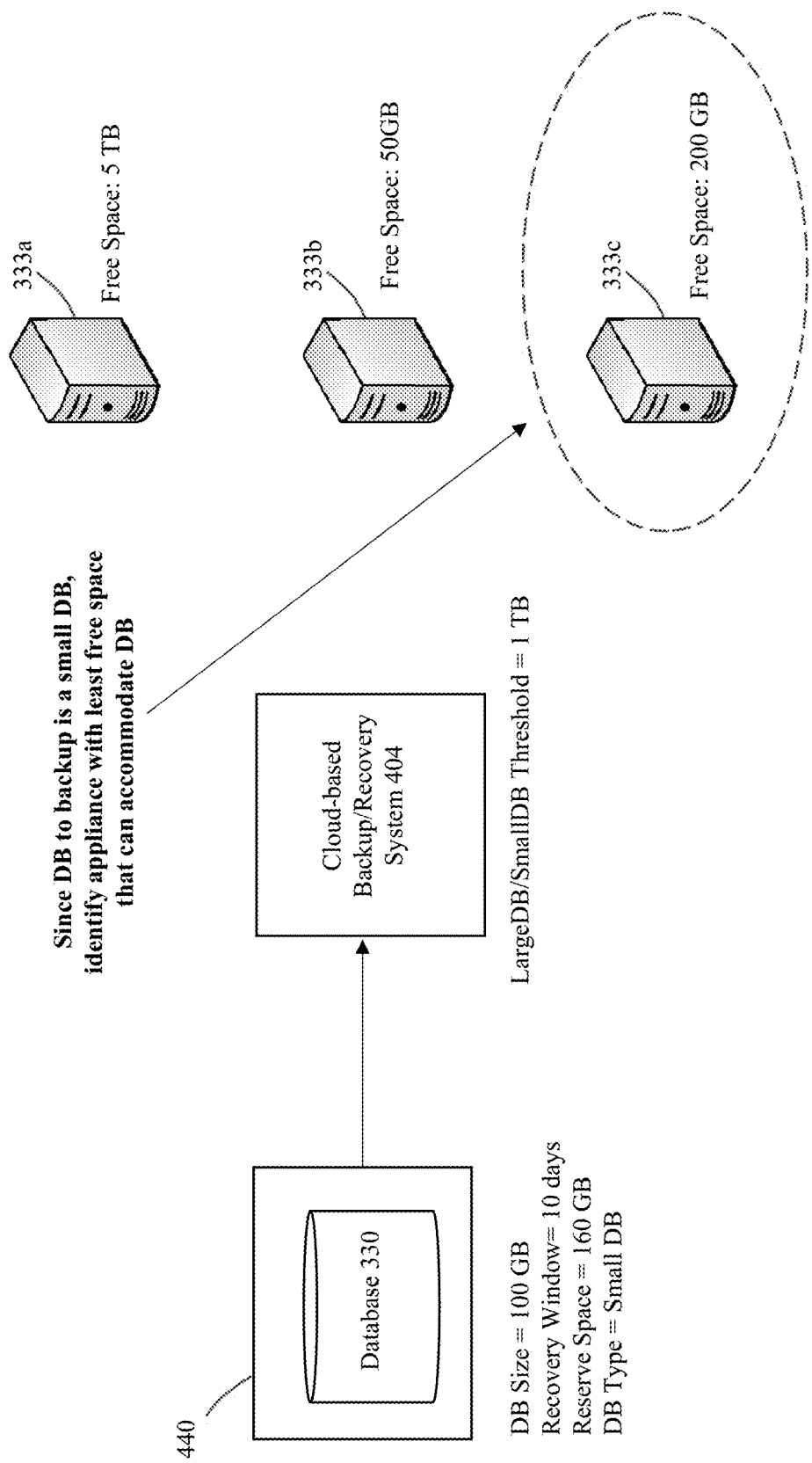
Figure 3E:
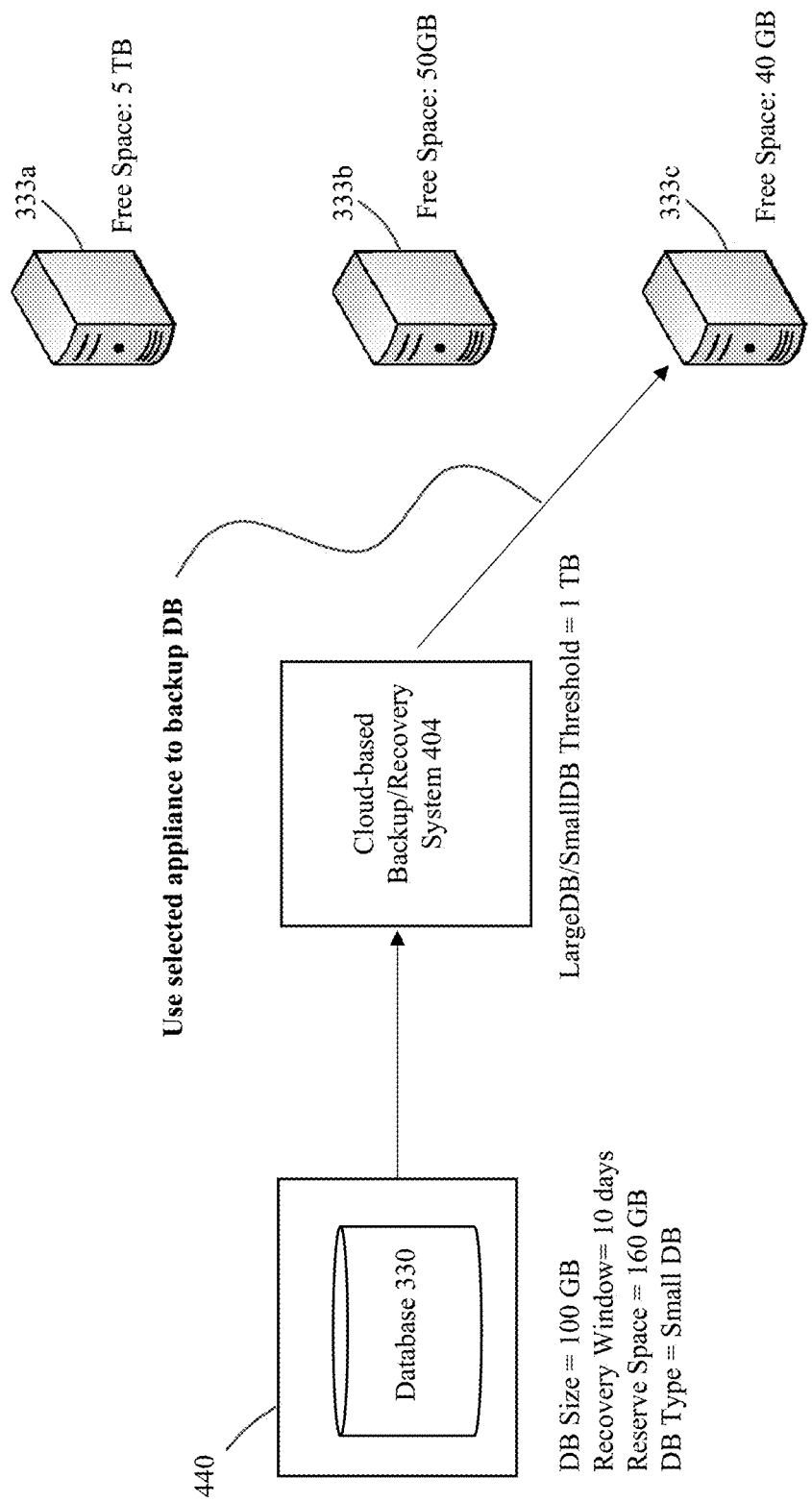

Since the database 330 is classified as a small database, a best fit approach is taken to attempt to pack the database 330 as best as possible within an existing appliance. This means that the appliance having the least free space that can accommodate the reserve space for the protected database is allocated to handle the backup services. In the current example, appliance 333*a* would be excluded as the selected appliance, since this appliance actually has the largest amount of free space. Even though appliance 333*b* has the least amount of free space, this appliance is also excluded from consideration since this appliance only has 50 GB of free space, which is less than the 160 GB of reserved space that is required to handle backups for database 330. Therefore, as shown in FIG. 3D, appliance 333*c* is allocated to handle backup services for database 330. This is because this appliance has the least amount of free space of the appliances that has enough free space (200 GB) to handle the required disk reserved space (160 GB) for database 330. Thereafter, as shown in FIG. 3E, the selected appliance 333*c* is used to handle backup services for the database 330. Appliance 333*c* is now shown in the figure having only 40 GB of available free space.

Figure 4A:
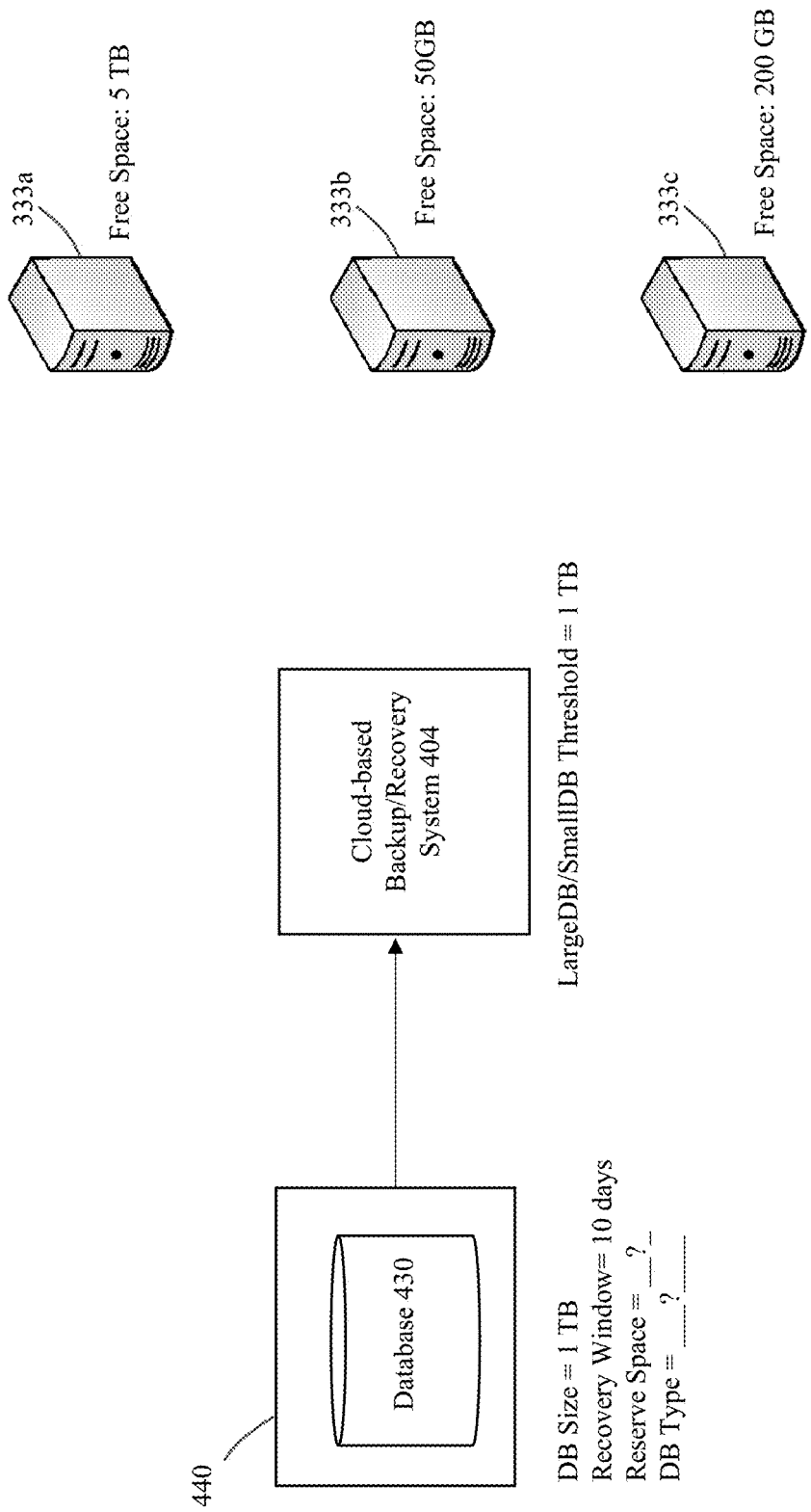
FIGS. 4A-4E provide an illustration of the situation involving a protected database that may be classified as a large database.

FIGS. 4A-E provide an illustration of the situation involving a protected database that may be classified as a large database. Same as the previous illustrative example, FIG. 4A shows a user system 440 that includes a database 430 to be serviced for recovery/backup purposes by one of the appliances 333*a*, 333*b*, or 333*c*, where the backup/recovery system 404 handles allocation of one of the appliances to the database 430. As before, appliance 333*a* has 5 TB of free space, appliance 333*b* has 50 GB of free space, and appliance 333*c* has 200 GB of free space.

Unlike the previous example, the current example includes a database 430 that has a database size of 1 TB. Same as the previous example, the recovery window for this protected database is configured as 10 days and the large/small database size threshold for allocations is set to 1 TB.

Figure 4B:
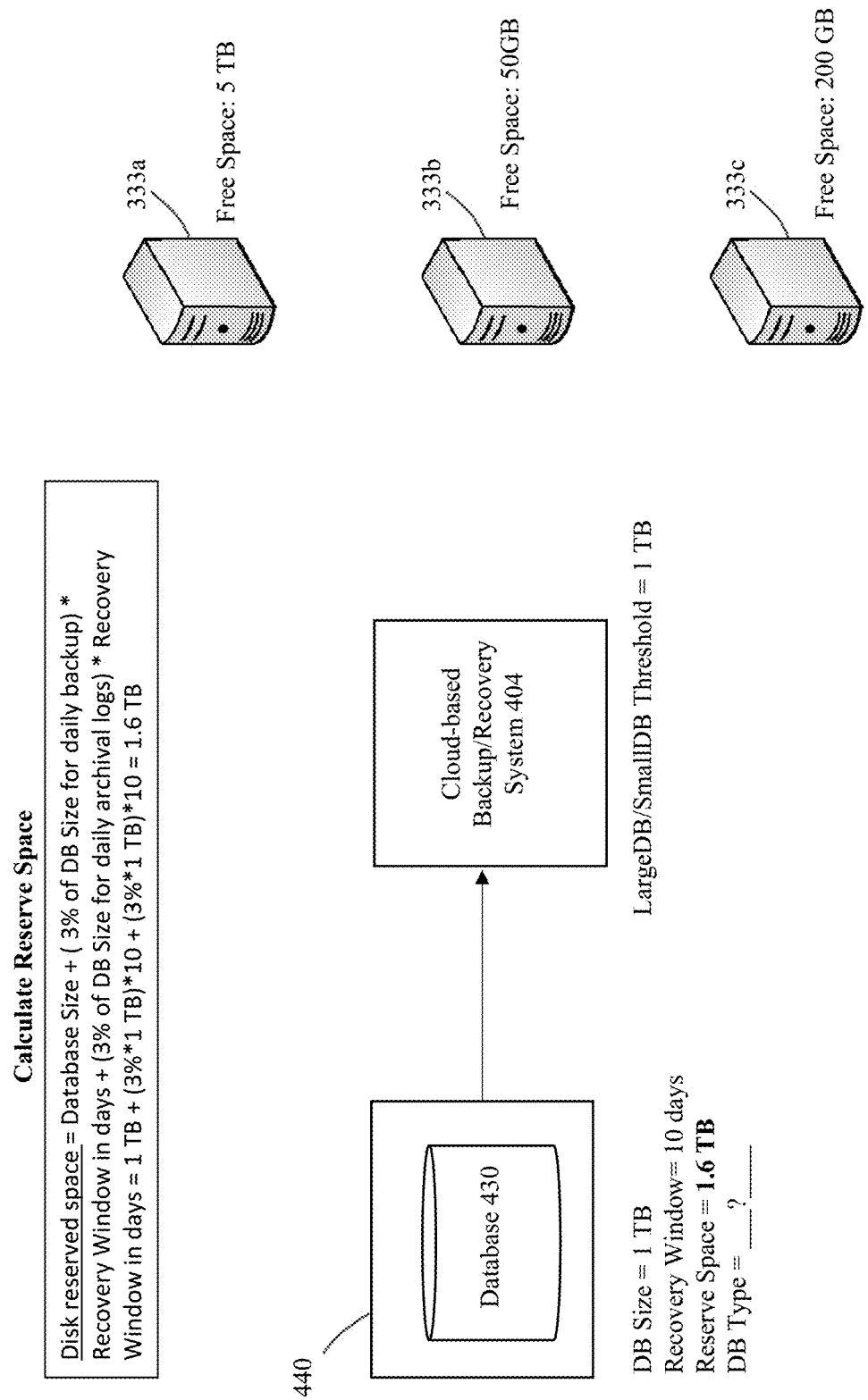

FIG. 4B illustrates the calculation of the disk reserved space that is needed to handle the backup/recovery services for database 430. In the current example, the calculations result in a determination that 1.6 TB of free space is needed as the disk reserved space.

Figure 4C:
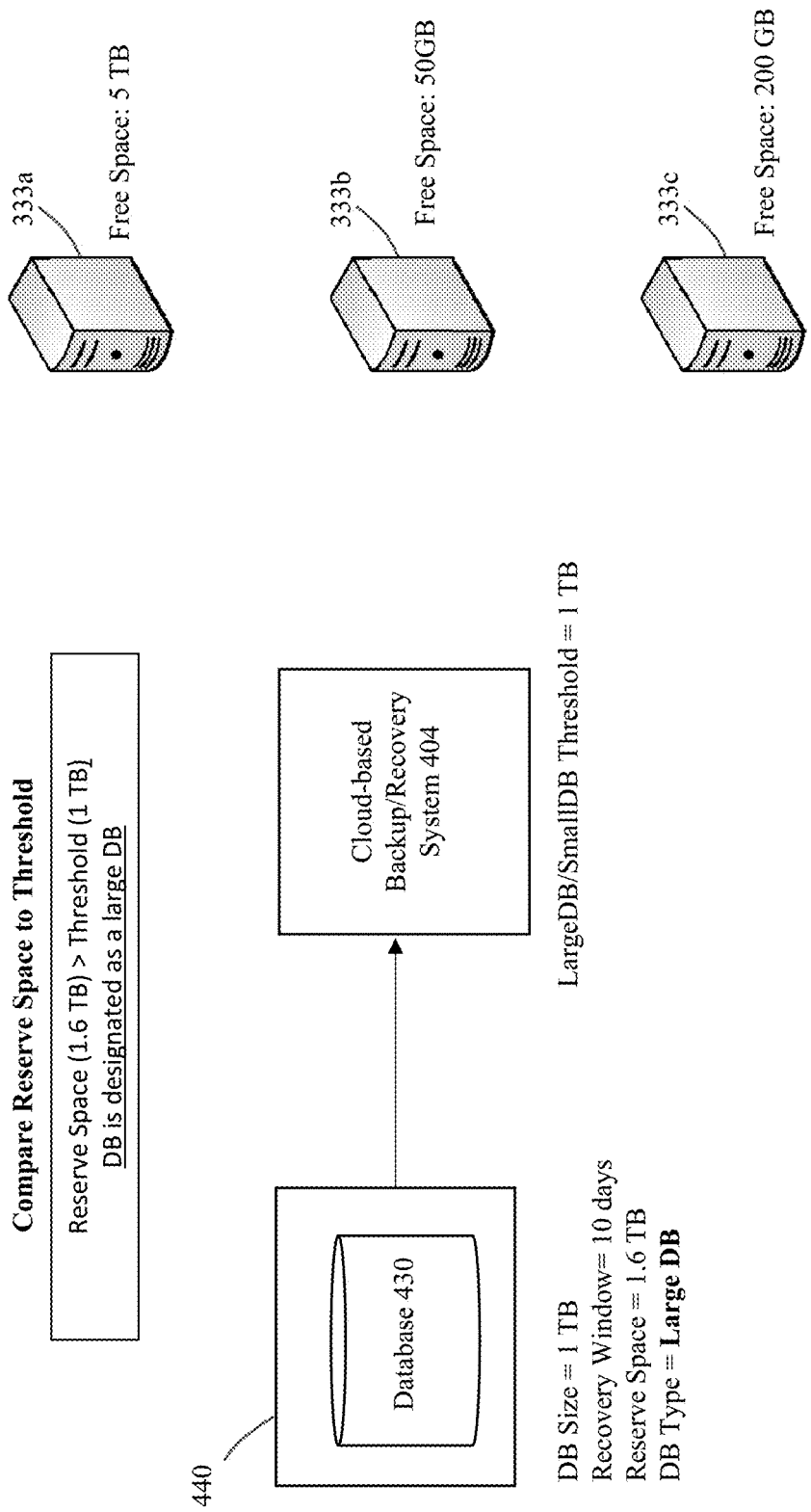

A determination is then made as to whether the database 430 corresponds to a large database or a small database. As illustrated in FIG. 4C, the threshold that has been set between the large and small databases for this system is 1 TB. Here, the reserve space for database 430 is 1.6 TB, which is greater than the threshold of 1 TB. Therefore, the database 430 is classified as a large database.

Figure 4D:
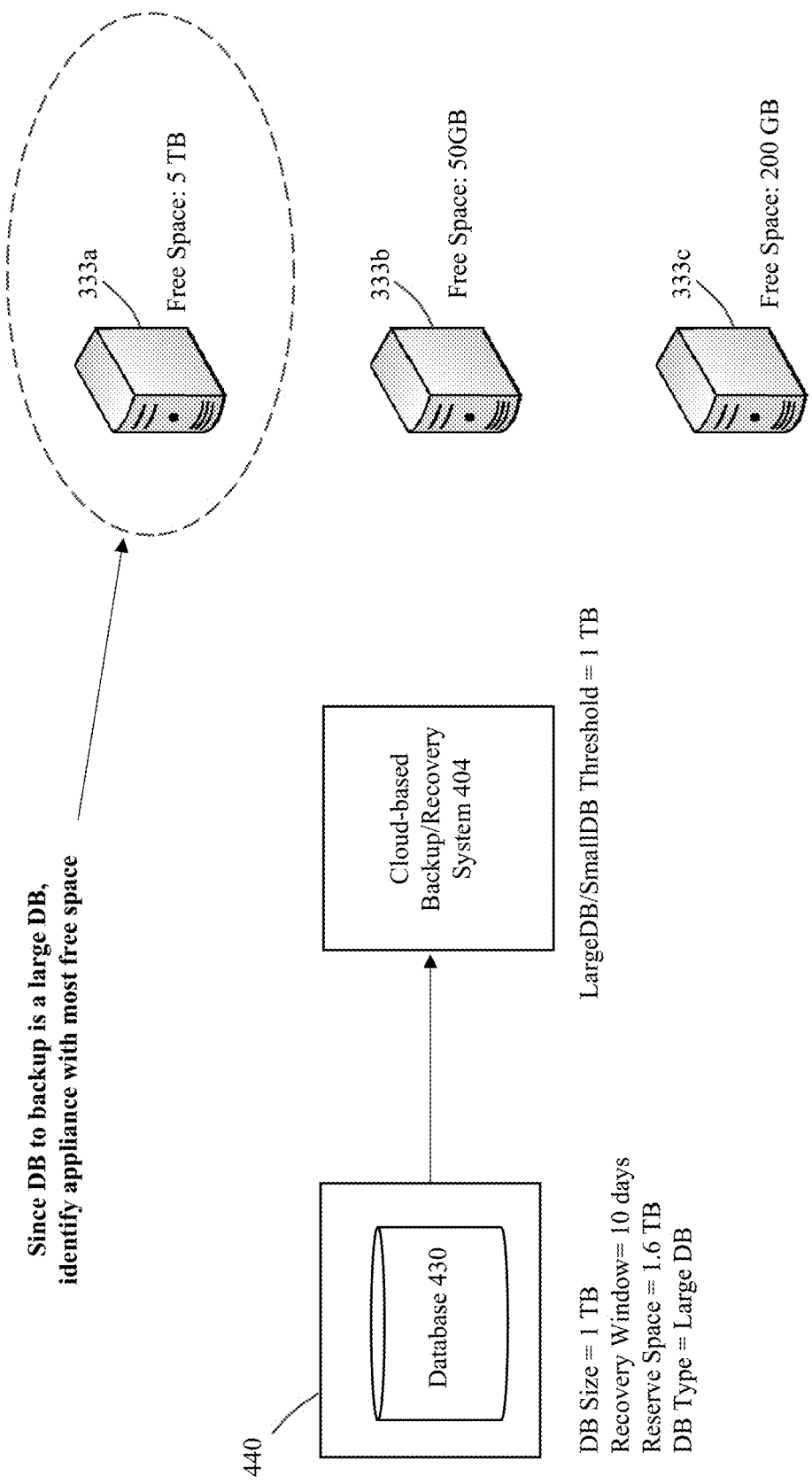
Figure 4E:
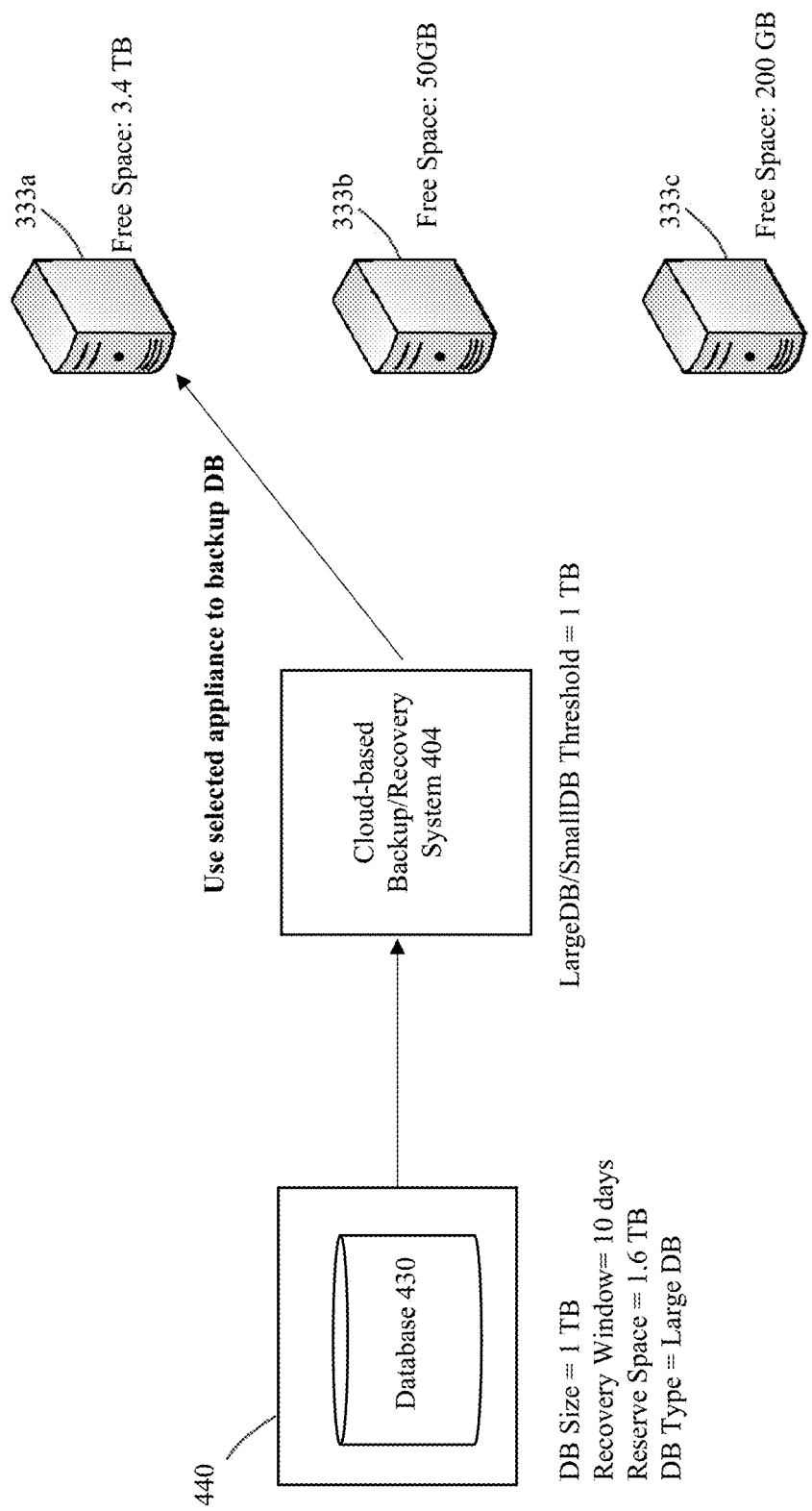

Since the database 430 is classified as a large database, an approach to implement best fit for spreading is taken to attempt to spread the database 430 as best as possible within the existing appliances. This means that the appliance having the most amount of free space is allocated to handle the backup services. As shown in FIG. 4D, appliance 333a is identified as the selected appliance, since this appliance has the largest amount of free space among the three appliances 33a, 33b, and 33c. Therefore, as shown in FIG. 4E, appliance 333a is used to handle backup services for the database 430. Appliance 333a is now shown in the figure having only 3.4 TB of available free space.

Figure 5A:
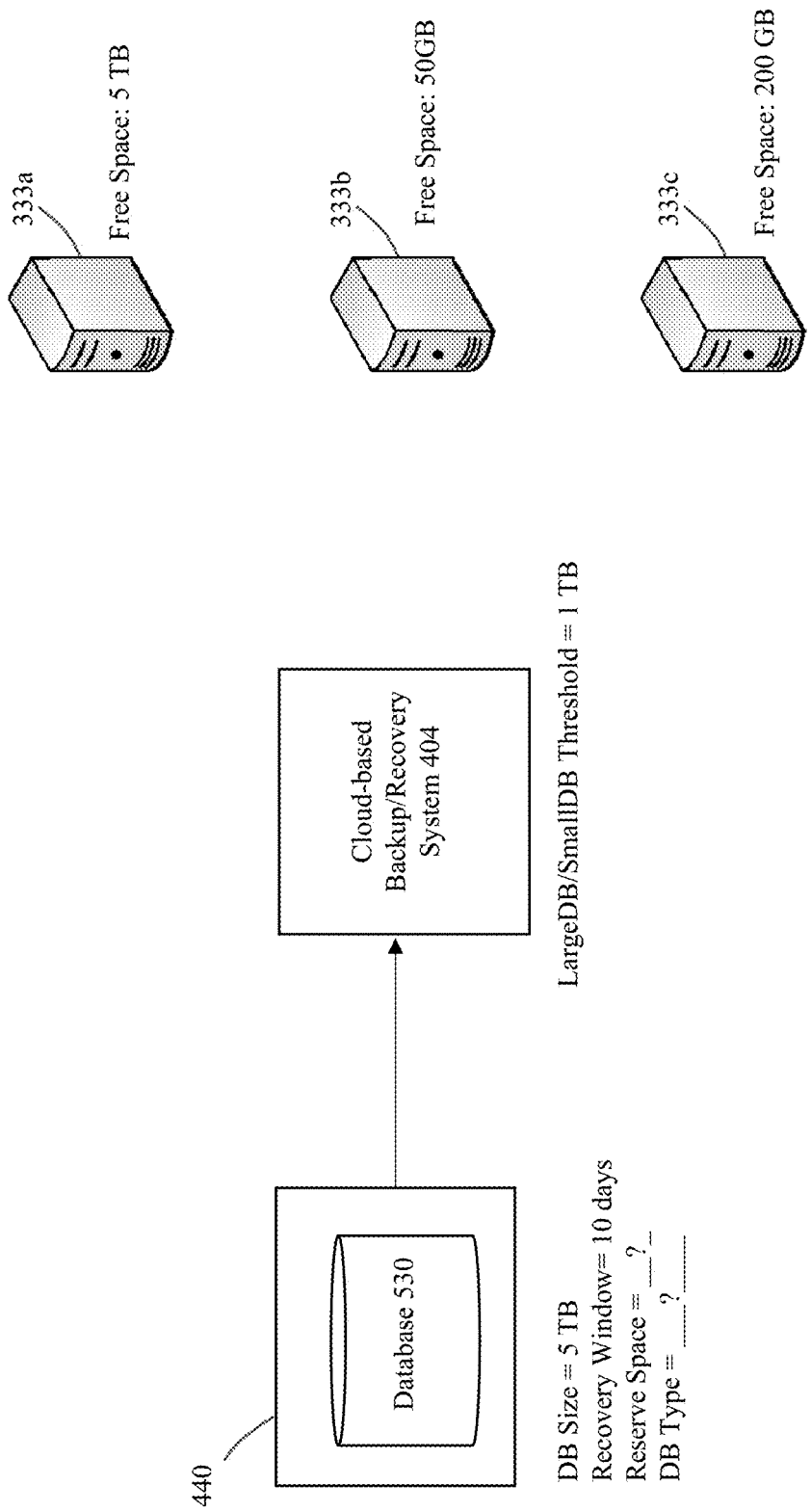
FIGS. 5A-5F provide another illustration of a situation involving a protected database that may be classified as a large database.

FIGS. 5A-F provide another illustration of a situation involving a protected database that may be classified as a large database. As before, FIG. 5A shows a user system 440 that includes a database 530 to be serviced for recovery/backup purposes by one of the appliances 333a, 333b, or 333c, where the backup/recovery system 404 handles allocation of one of the appliances to the database 530. Same as the previous examples, appliance 333a has 5 TB of free space, appliance 333b has 50 GB of free space, and appliance 333c has 200 GB of free space.

Unlike the previous example, the current example includes a database 530 that has a database size of 5 TB. Same as the previous examples, the recovery window for this protected database is configured as 10 days and the large/small database size threshold for allocations is set to 1 TB.

Figure 5B:
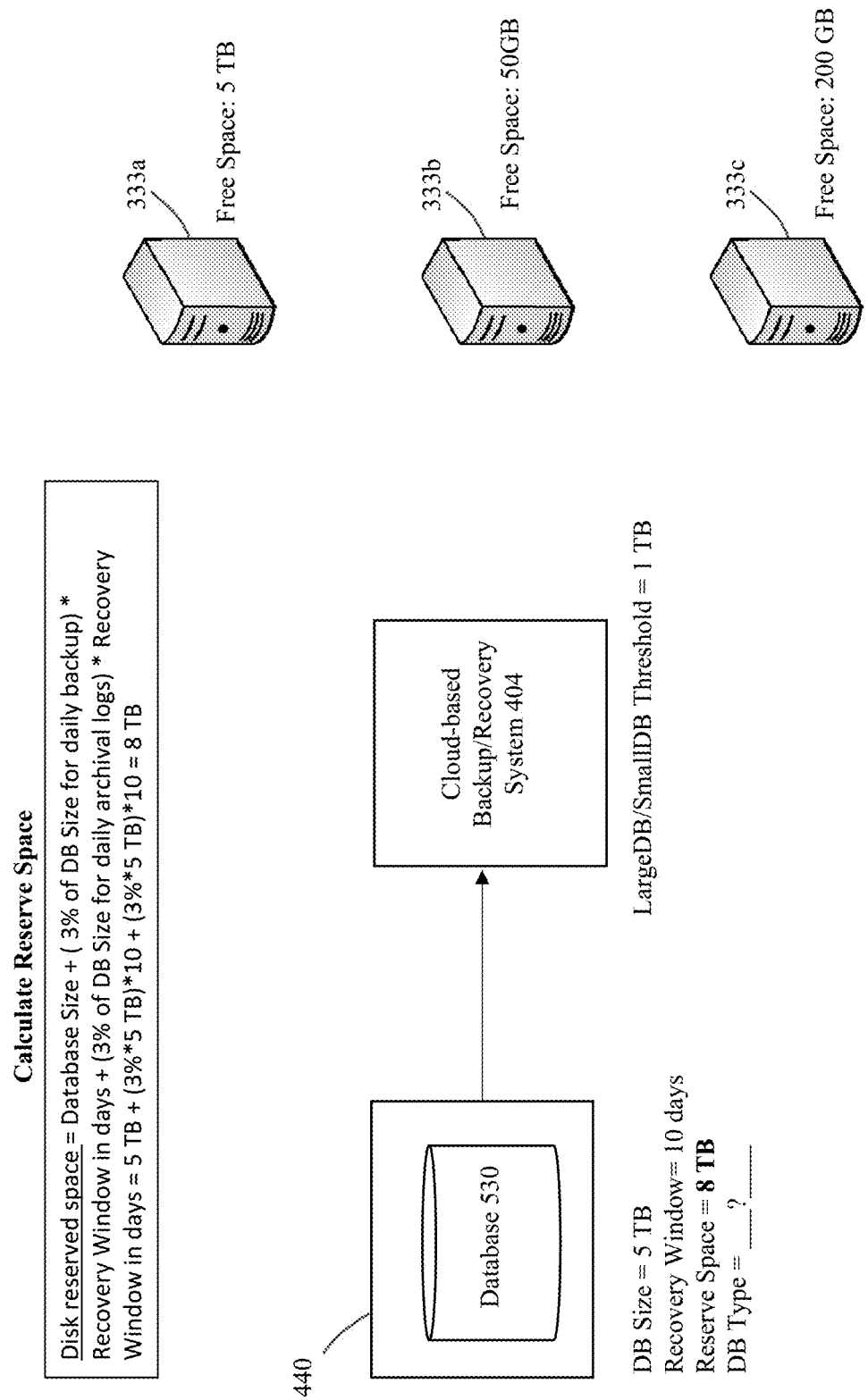
Figure 5C:
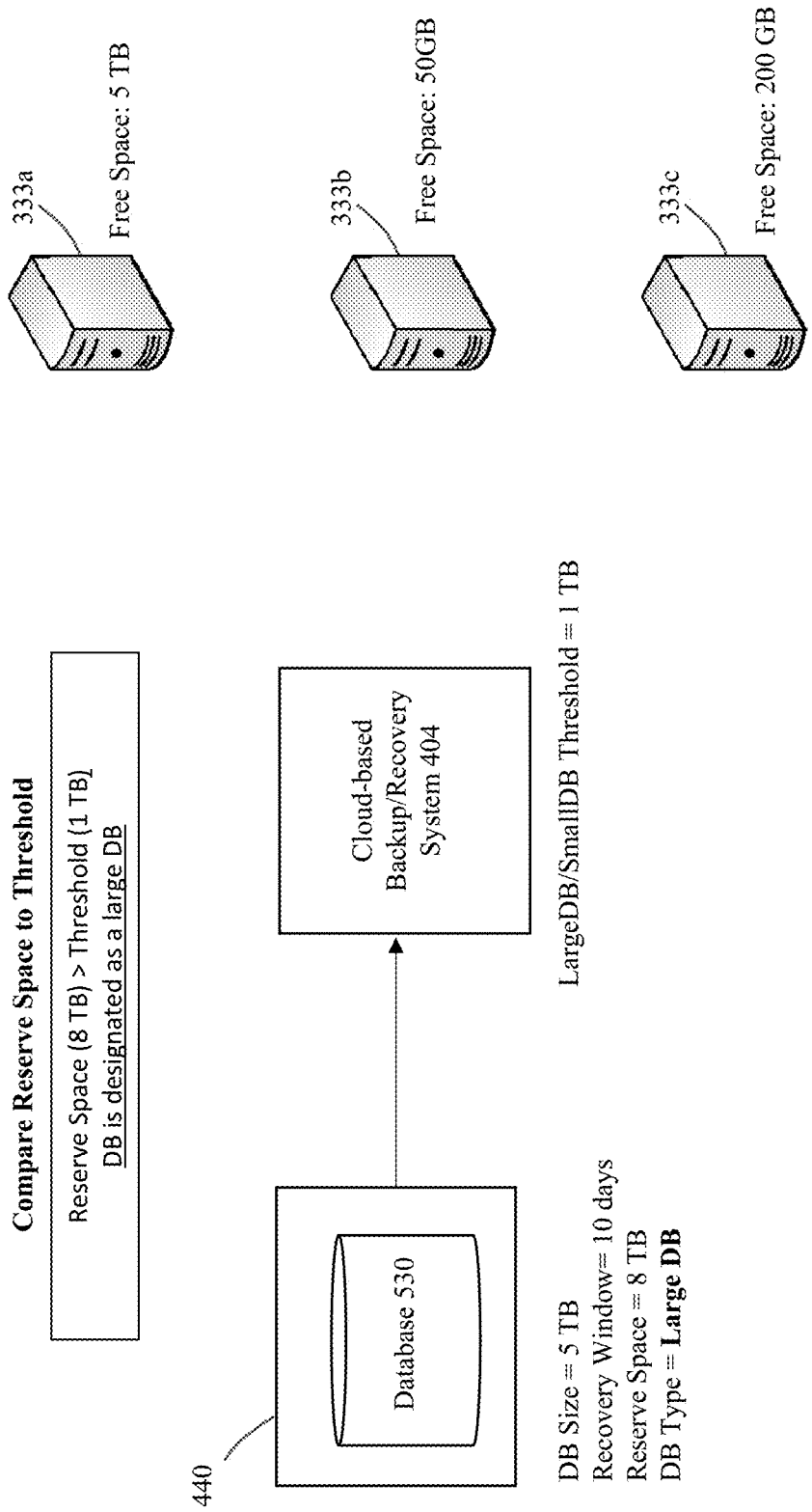

FIG. 5B illustrates the calculation of the disk reserved space that is needed to handle the backup/recovery services for database 530. In the current example, the calculations result in a determination that 8 TB of free space is needed as the disk reserved space. A determination is then made as to whether the database 530 corresponds to a large database or a small database. As illustrated in FIG. 5C, since the reserve space is 8 TB which is greater than the threshold of 1 TB, this means that the database 530 should be classified as a large database.

Figure 5D:
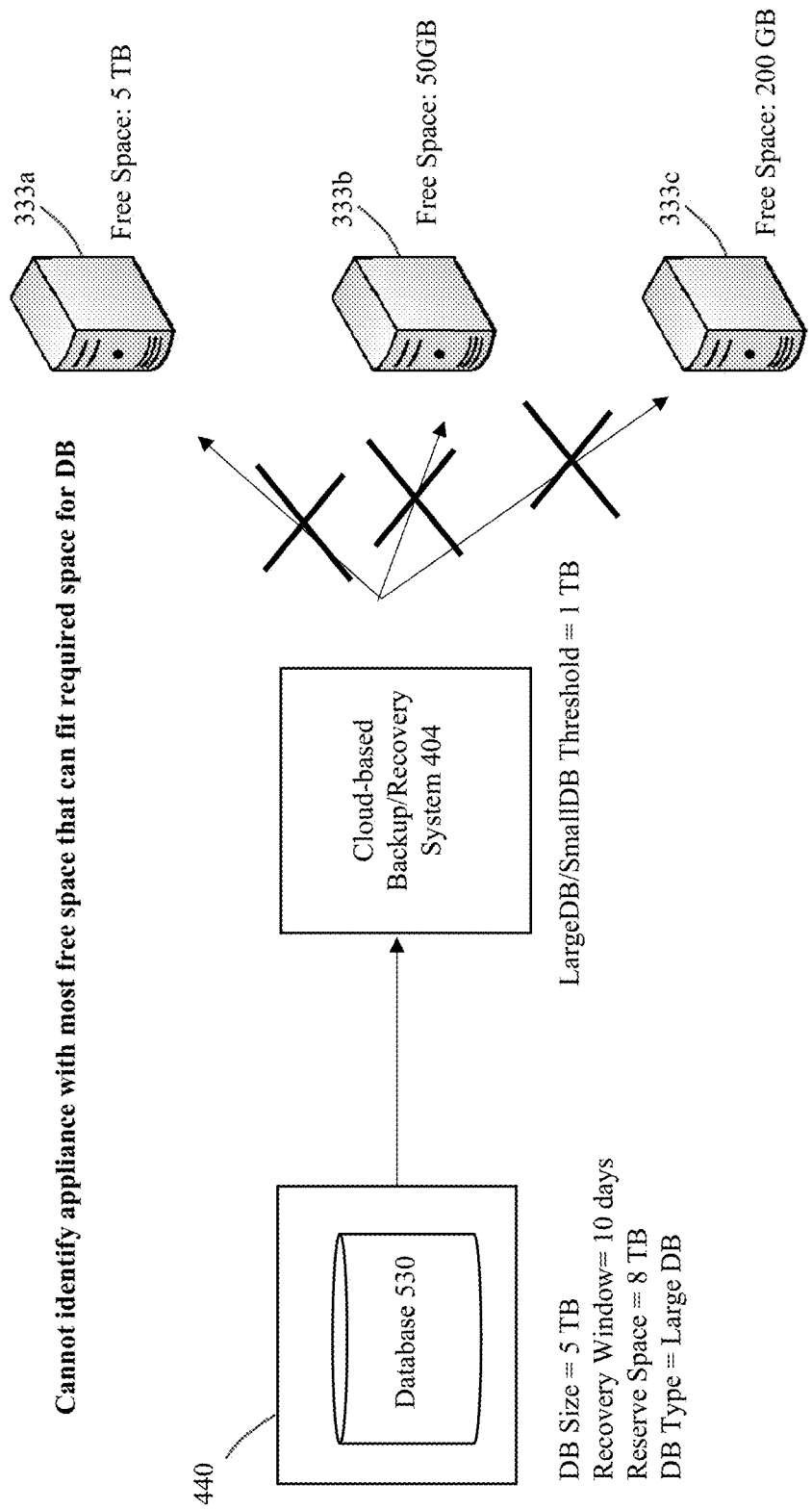

Since the database 530 is classified as a large database, an approach to implement best fit for spreading is taken to attempt to spread the database 530 as best as possible within the existing appliances. This means that the appliance having the most amount of free space that is capable of accommodating the database 530 is allocated to handle the backup services. As shown in FIG. 5D, none of the appliances 333a, 333b, or 333c is capable of being allocated to database 530, since none of these appliances has enough free space to accommodate database 530. In particular, appliance 333a has the greatest amount of free space at 5 TB. However, the required disk reserved space for database 530 is determined to be 8 TB, which is greater than the 5 TB of free space on appliance 333a.

Figure 5E:
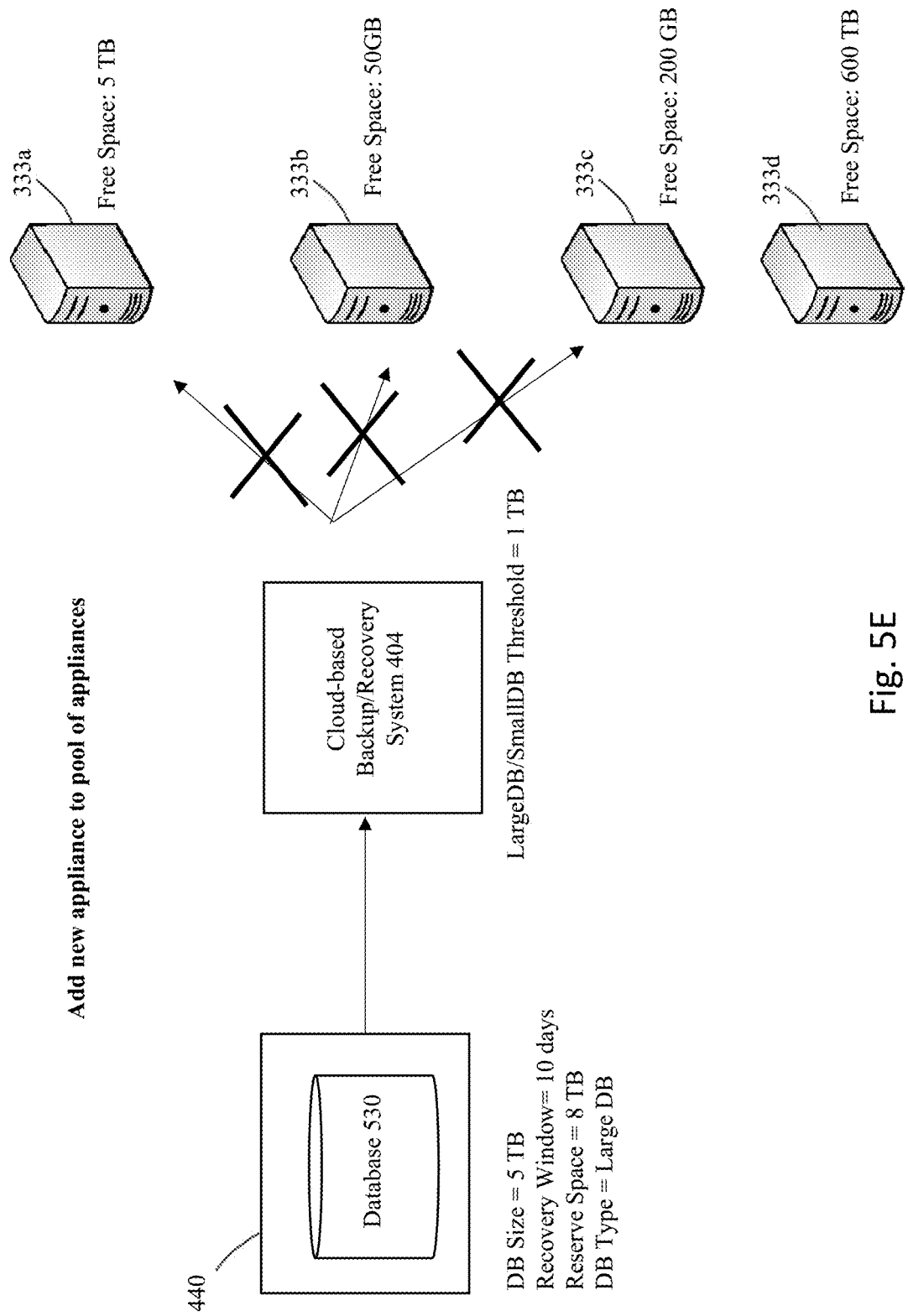
Figure 5F:
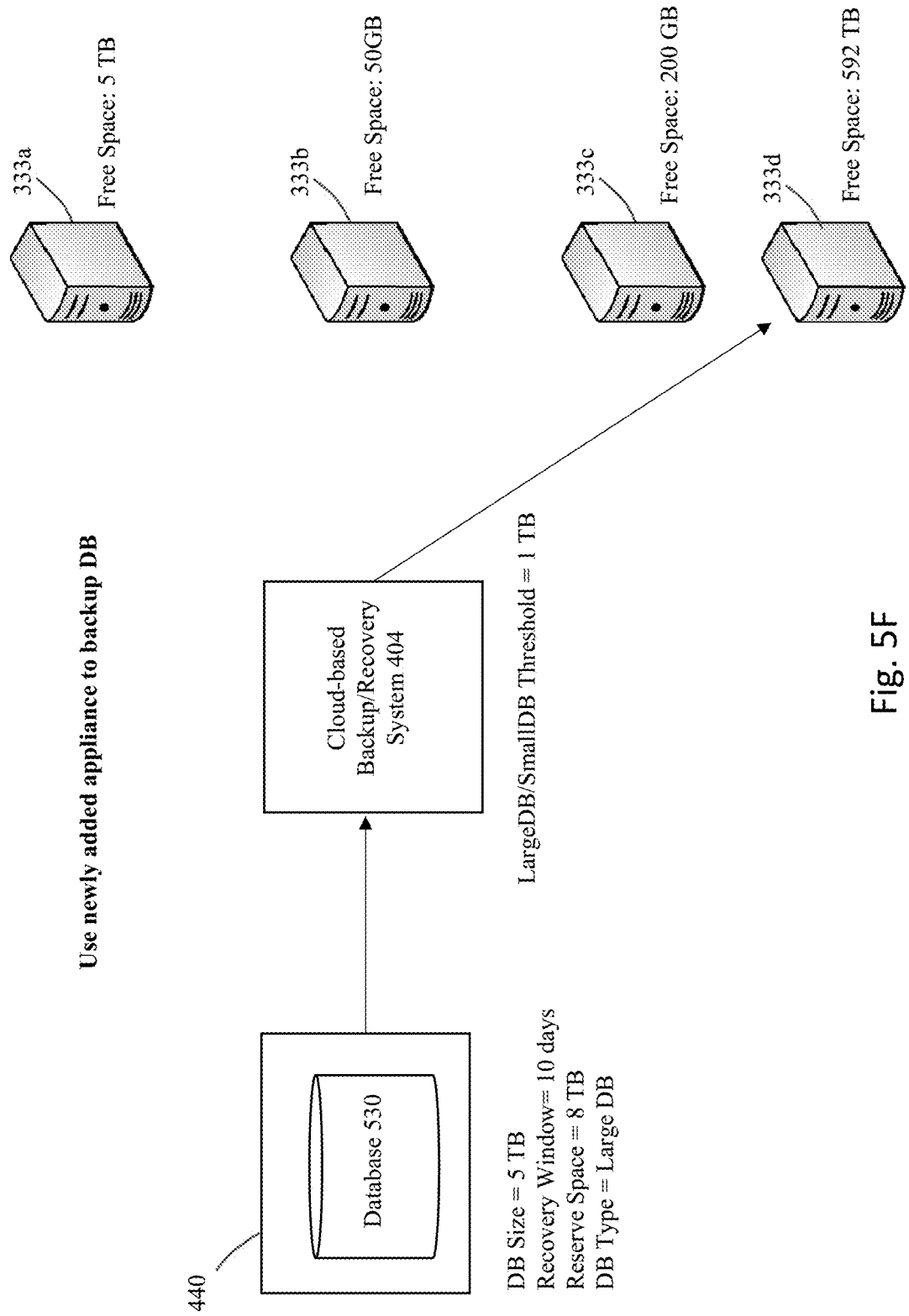

Therefore, as shown in FIG. 5E, one way to handle this situation is to add a new recovery/backup appliance into the cloud service. Here, appliance 333d is newly on-boarded into the system and has 600 TB of free space to handle backups. Since appliance 333d is now the one with the most amount of free space which is capable of accommodating the protected database 530, then as shown in FIG. 5F, this appliance 333d is allocated to handle backup services for the database 530. Appliance 333d is now shown in the figure having 592 TB of available free space after the allocation.

The above-described approach uses various values to determine the appropriate allocation of an appliance to a database, such as the value of the change rate or archival log size(s) for the protected database. As previously noted, a generalized estimated value such as 3% may be selected at least initially for a database for these values to determine a disk reserved space. This is because at the start of the on-boarding process, there may be insufficient data regarding the real change rate of the protected database. However, as the system starts receiving backup data, then actual data values can be used to calculate the real change rate and daily average archival log size for the protected database. For example, where the recovery window time frame has been reached, then the disk reserved space can be determined as the actual amount used space for the protected database. In the situation where the recovery window time frame has not been reached, then the following formula may be used to calculate the disk reserved space after n days of back: "disk reserved space=newL0+(newL1+newR1)*(recovery window)". In this formula, (a) newL0=Size of L0 backup received, (b) newL1=(total size of all L1s)/n, and (c) newR1=(total size of all Redo logs (or archival log received)/n.

In some embodiments, the database size (large/small) threshold may be changed on a dynamic and/or as-needed basis to tune the functionality of the recovery/backup system.

Figure 6:
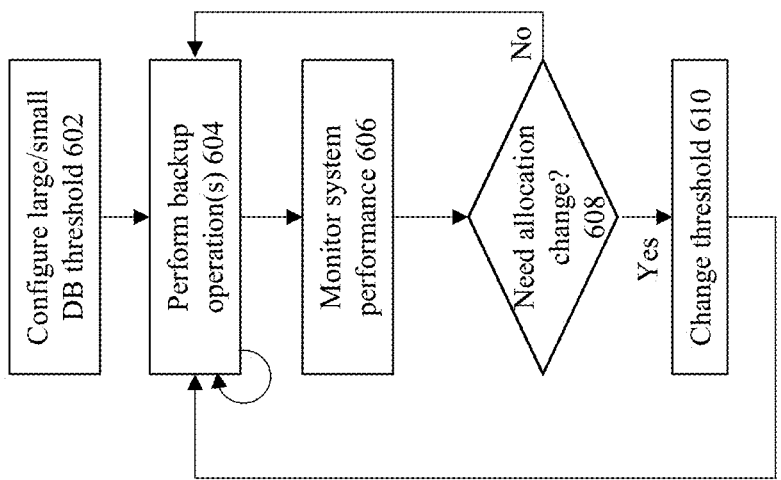
FIG. 6 shows a flowchart of an approach to change the database size threshold according to some embodiments of the invention.

FIG. 6 shows a flowchart of an approach to implement this aspect of certain embodiments of the invention. At 602, a database size threshold is configured for the system. Until actual performance data is received for a given system and/or system conditions, the initial threshold would be a best guess regarding an appropriate threshold value, e.g., based upon historical analysis of recovery services in the past for similar databases. The initial value may be a fixed value, e.g., a fixed 1 TB threshold, or the threshold value may be established as a relative value based upon the properties of the various databases that are being handled in the system, e.g., a median value or some other percentile value.

At 604, backup (and recovery) operations would be performed in the system using the selected threshold value(s). For example, databases classified as either large or small based upon the threshold values, and the appropriate allocation approach would be applied depending upon whether the classified database is large or small.

The performance and utilization of the system may be affected by the specific threshold value that was selected. If the threshold that was selected is too small, then too many databases would be classified as large databases, resulting in over-spreading of the backup data across appliances. This situation may negatively affect the overall utilization levels for appliances within the system. On the other hand, if the threshold value is selected to large, then too many databases may be classified as small databases, resulting in the overpacking of appliances. This may cause performance problems if too many databases are crammed onto the same appliance, particularly for larger databases.

Therefore, at step 606, system data is monitored throughout the appliances, e.g., to collect data regarding performance levels for the recover/backup services being provided to users as well as the utilization levels for the appliances and/or overall system. The collected data can be used to determine, at 608, whether the threshold level needs to change to modify the allocations that are made within the system, e.g., if it is determined that either too much data spreading or too much data packing has occurred. This determination may be performed using a set of heuristic rules that checks performance and/or utilization attributes, where the rules check for at least one of too much data packing or too much data spreading/load balancing. In some embodiments, a learning approach may be taken where system modeling is performed to generate one or more machine learning models. On an ongoing basis, the collected data is analyzed relative to the predicted performance/utilization based at least in part upon the machine learning models, to determine whether the threshold is set either too high or too low.

If it is determined that the threshold should be adjusted, then at step 610, the threshold is adjusted by an amount necessary to achieve desired system conditions. For example, if too much spreading is occurring for the backup data, then the threshold may be adjusted upwards to reduce the number of databases that are considered large databases and which increases the number of databases that are considered small databases. If too much packing is occurring, then the opposite is implemented whereby the threshold is adjusted downwards to increase the number of databases that are considered large databases and which decreases the number of databases that are considered small databases.

It is noted that various types of checks or balances may be implemented within the system in order to address possible problems that may occur. For example, space maybe reserved on each appliance as a buffer in case the estimates for the required disk reserved space is incorrect, to handle the situation where the actual required space is much larger than estimated. In some embodiments, the buffer corresponds to the size of the largest database that is currently allocated to a given appliance, e.g., where an appliance hosts databases of size 10 TB, 5 TB, and 2 TB, the reserve buffer is 10 TB corresponding to the size of the larges database. As another level of protection against performance issues, an upper limit may be imposed on the number of databases that can be allocated to a given appliance. In addition, a "do not allocate" mode may be established where no new a databases will be allocated to an appliance that is set to this mode. Moreover, if necessary, a database is permitted to be migrated from one appliance to another, e.g., to increase packing and decrease spreading, or vice versa.

Therefore, what has been described is an improved approach to perform allocations of appliances for backups of databases, particularly in a cloud-based environment. This approach improves upon alternate approaches that may require manual configuration and guesswork by users, given the error-prone nature of the manual process and the possibility of running out of space if the manual process results in a wrong answer. The embodiments of the invention no longer requires any user guesswork, but merely asks for a small set of information (e.g., database size and recovery window) about the database to be backed up, and an automated assignment of an appropriate appliance can then proceed from that automated allocation. The approach optimizes allocations by balancing the desire to spread the protected databases across appliances to provide good service, while increasing utilization by reducing fragmentation. While it is possible to migrate a protected database from one appliance to another, the present approach therefore minimizes the number of times that migration is needed since the correct appliance is more likely to be selected upfront, which reduces system costs since there is a cost for each migration.

System Architecture Overview

Figure 7:
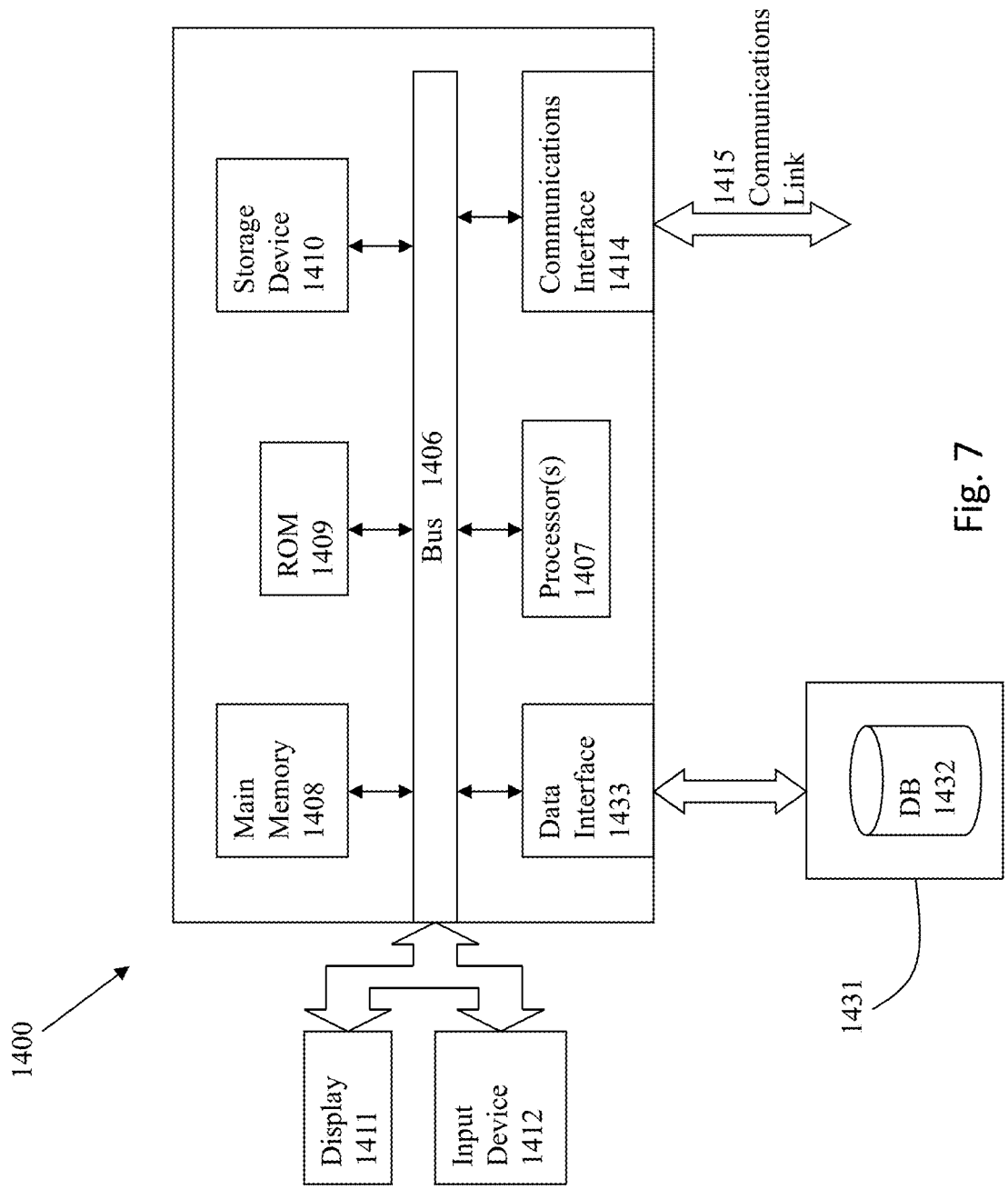
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
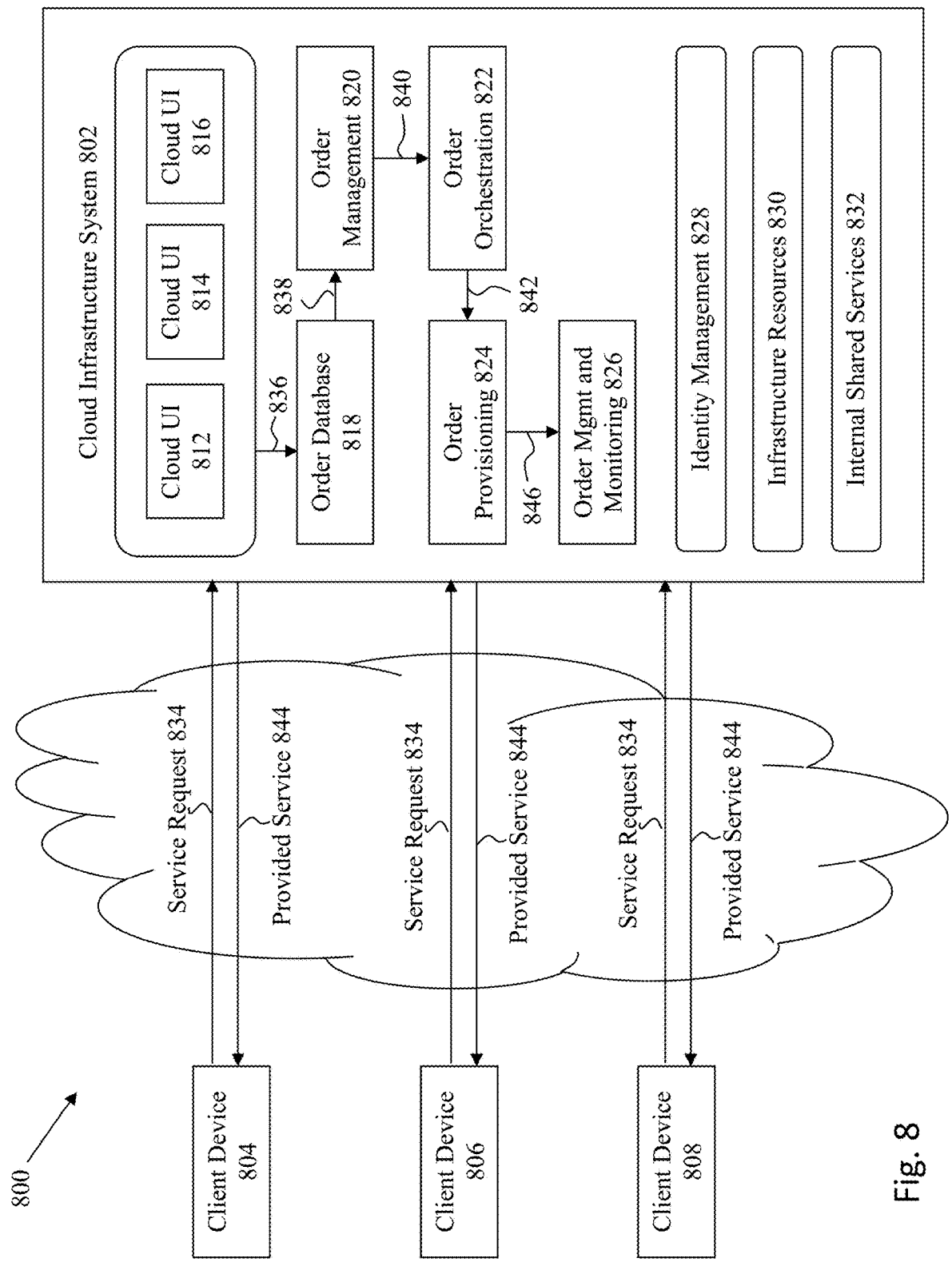
FIG. 8 is a block diagram of one or more components of a system environment in which services may be offered as cloud services, in accordance with an embodiment of the present invention.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method, comprising:
   maintaining a plurality of devices to store backup data for database systems;
   identifying a database to back up to the plurality of devices;
   determining a space requirement for backing up the database,
   comparing the space requirement to a database size threshold;
   allocating, when the space requirement is larger than the database size threshold, the database to a first device having a greatest amount of free space from among the plurality of devices; and
   allocating, when the space requirement is smaller than the database size threshold, the database to a second device having a smallest amount of free space from among the plurality of devices that at least includes enough of the free space to meet the space requirement for backing up the database.

2. The method of claim 1, wherein the plurality of devices is maintained as a cloud-based service for providing recovery and backup services to users, the plurality of devices being shared by multiple users.

3. The method of claim 1, wherein the space requirement for backing up the database is determined based upon a database size combined with a database growth value based at least in part upon a change rate and an archival size correlated to a recovery window size.

4. The method of claim 3, wherein the recovery window size is based upon a protection policy that is established for the database.

5. The method of claim 1, wherein the database size threshold is adjusted to a higher value to increase data packing onto the plurality of devices.

6. The method of claim 1, wherein the database size threshold is adjusted to a smaller value to increase data spreading across the plurality of devices.

7. The method of claim 1, wherein a learning model is utilized to determine whether to modify the database size threshold.

8. A system for backing up a database in a database system, comprising:
   a processor;
   a memory for holding programmable code; and
   wherein the programmable code includes instructions for identifying a database to back up to a plurality of devices; determining a space requirement for backing up the database, comparing the space requirement to a database size threshold; allocating, when the space requirement is larger than the database size threshold, the database to a first device having a greatest amount of free space from among the plurality of devices; and allocating, when the space requirement is smaller than the database size threshold, the database to a second device having a smallest amount of free space from among the plurality of devices that at least includes enough of the free space to meet the space requirement for backing up the database.

9. The system of claim 8, wherein the plurality of devices is maintained as a cloud-based service for providing recovery and backup services to users, the plurality of devices being shared by multiple users.

10. The system of claim 8, wherein the space requirement for backing up the database is determined based upon a database size combined with a database growth value based at least in part upon a change rate and an archival size correlated to a recovery window size.

11. The system of claim 10, wherein the recovery window size is based upon a protection policy that is established for the database.

12. The system of claim 8, wherein the database size threshold is adjusted to a higher value to increase data packing onto the plurality of devices.

13. The system of claim 8, wherein the database size threshold is adjusted to a smaller value to increase data spreading across the plurality of devices.

14. The system of claim 8, wherein a learning model is utilized to determine whether to modify the database size threshold.

15. A computer program product embodied on a computer readable medium, the computer readable medium having stored thereon a sequence of instructions which, when executed by a processor, executes a method comprising:

maintaining a plurality of devices to store backup data for database systems;

identifying a database to back up to the plurality of devices;

determining a space requirement for backing up the database, comparing the space requirement to a database size threshold;

allocating, when the space requirement is larger than the database size threshold, the database to a first device having a greatest amount of free space from among the plurality of devices; and allocating, when the space requirement is smaller than the database size threshold, the database to a second device having a smallest amount of free space from among the plurality of devices that at least includes enough of the free space to meet the space requirement for backing up the database.

16. The computer program product of claim 15, wherein the plurality of devices is maintained as a cloud-based service for providing recovery and backup services to users, the plurality of devices being shared by multiple users.

17. The computer program product of claim 15, wherein the space requirement for backing up the database is determined based upon a database size combined with a database growth value based at least in part upon a change rate and an archival size correlated to a recovery window size.

18. The computer program product of claim 17, wherein the recovery window size is based upon a protection policy that is established for the database.

19. The computer program product of claim 15, wherein the database size threshold is adjusted to a higher value to increase data packing onto the plurality of devices.

20. The computer program product of claim 15, wherein the database size threshold is adjusted to a smaller value to increase data spreading across the plurality of devices.

21. The computer program product of claim 15, wherein a learning model is utilized to determine whether to modify the database size threshold.

* * * * *